United States Patent
Sugino

(10) Patent No.: US 11,085,549 B1
(45) Date of Patent: Aug. 10, 2021

(54) VALVE

(71) Applicant: PACIFIC INDUSTRIAL CO., LTD., Ogaki (JP)

(72) Inventor: Takumi Sugino, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 30 days.

(21) Appl. No.: 16/644,054

(22) PCT Filed: Mar. 26, 2019

(86) PCT No.: PCT/JP2019/013049
§ 371 (c)(1),
(2) Date: Mar. 3, 2020

(87) PCT Pub. No.: WO2020/194561
PCT Pub. Date: Oct. 1, 2020

(51) Int. Cl.
*F16K 15/20* (2006.01)
*F16K 15/02* (2006.01)
(Continued)

(52) U.S. Cl.
CPC .......... *F16K 15/026* (2013.01); *B60C 29/002* (2013.01); *B60C 29/005* (2013.01); *F16K 15/063* (2013.01); *Y10T 137/3786* (2015.04)

(58) Field of Classification Search
CPC .......... Y10T 137/3584; Y10T 137/3786; F16L 37/32; F16L 37/36; F16L 37/40; F16L 37/44

(Continued)

(56) References Cited

U.S. PATENT DOCUMENTS 1,313,554 A * 8/1919 Nielsen ................... F16K 15/20
137/233
2,240,129 A 4/1941 Broecker
(Continued)

FOREIGN PATENT DOCUMENTS

CN 1006657 B 1/1990
CN 1219227 A 6/1999
(Continued)

OTHER PUBLICATIONS

Oct. 27, 2020 Extended Search Report issued in European Patent Application No. 19856442.9.
(Continued)

*Primary Examiner* — Robert K Arundale
(74) *Attorney, Agent, or Firm* — Oliff PLC

(57) ABSTRACT

A valve includes a tubular body having one end attached to a valve attachment hole; a valve opening; a valve member to open and close the valve opening; a shaft part extending axially along an the body; a valve body part extending radially from the shaft to slide in the opening; a valve chamber adjacent to the opening on one end side in the axial direction, connecting the opening and attachment hole entirely; a valve body holding mechanism holding the body part inside the opening as an operating force causing the member to move in the axial direction, allowing the body part to separate from the opening wherein the member receives an operating force moving towards one end side of the body; a retaining mechanism changes between a restricting state wherein the member is prevented from coming off, and a permitting state wherein the member is allowed to come off.

20 Claims, 18 Drawing Sheets

(51) Int. Cl.
*B60C 29/00* (2006.01)
*F16K 15/06* (2006.01)

(58) Field of Classification Search
USPC ........................................................ 251/149.6
See application file for complete search history.

(56) References Cited

U.S. PATENT DOCUMENTS

| | | | | | |
|---|---|---|---|---|---|
| 2,625,170 | A | * | 1/1953 | Mayer | F16K 15/20 137/223 |
| 2,862,515 | A | * | 12/1958 | Briechle | F16K 15/20 137/234.5 |
| 3,712,328 | A | * | 1/1973 | McAnally | F16K 15/20 137/234.5 |
| 4,275,756 | A | * | 6/1981 | Cairns | B60C 29/00 137/234.5 |
| 4,340,080 | A | * | 7/1982 | Lefrancois | F16K 15/20 137/223 |
| 4,506,695 | A | * | 3/1985 | Kuypers | B60C 29/02 137/223 |
| 4,739,813 | A | * | 4/1988 | Pagani | B60C 29/02 137/223 |
| 4,768,574 | A | | 9/1988 | Probst | |
| 4,819,685 | A | * | 4/1989 | Pagani | B60C 29/02 137/223 |
| 4,836,235 | A | * | 6/1989 | Pagani | F16K 15/20 137/223 |
| 4,979,721 | A | * | 12/1990 | Gilbert | F16K 27/0209 137/515.5 |
| 5,558,117 | A | | 9/1996 | McGuinness | |
| 6,234,450 | B1 | * | 5/2001 | Jeory | F16L 55/07 137/223 |
| 6,719,003 | B2 | * | 4/2004 | Schroeder | F16K 15/063 137/234.5 |
| 9,969,242 | B2 | * | 5/2018 | Kesler | B60H 1/00585 |
| 10,359,127 | B2 | * | 7/2019 | Dole | F16K 47/00 |
| 2003/0116740 | A1 | * | 6/2003 | Schroeder | F16K 15/063 251/149.6 |
| 2004/0261847 | A1 | * | 12/2004 | Kayukawa | F16K 15/20 137/234.5 |
| 2004/0261848 | A1 | * | 12/2004 | Kayukawa | F16K 15/20 137/234.5 |
| 2007/0246099 | A1 | * | 10/2007 | Yamamoto | B60C 29/00 137/234.5 |
| 2008/0115838 | A1 | * | 5/2008 | Huang | F16K 15/207 137/223 |
| 2010/0038573 | A1 | * | 2/2010 | Lucas | F16K 1/303 251/149.6 |
| 2020/0408314 | A1 | * | 12/2020 | Sugino | B60C 29/002 |

FOREIGN PATENT DOCUMENTS

| | | |
|---|---|---|
| CN | 201093106 Y | 7/2008 |
| CN | 100455861 C | 1/2009 |
| CN | 100491787 C | 5/2009 |
| CN | 205824297 U | 12/2016 |
| GB | 1 602 141 A | 11/1981 |
| JP | S44-17803 B1 | 8/1969 |
| JP | H04-285376 A | 10/1992 |
| JP | 2015-512826 A | 4/2015 |
| WO | 99/063252 A1 | 12/1999 |

OTHER PUBLICATIONS

Nov. 6, 2020 Office Action issued in European Patent Application No. 19 856 442.9.
Nov. 6, 2020 Search Report issued in Taiwanese Patent Application No. 109109324.
Jul. 2, 2019 Search Report issued in International Patent Application No. PCT/JP2019/013049.
Jul. 2, 2019 Written Opinion of the International Searching Authority issued in International Patent Application No. PCT/JP2019/013049.
Mar. 11, 2021 Office Action and Search Report issued in Taiwanese Office Action 109109324.

* cited by examiner

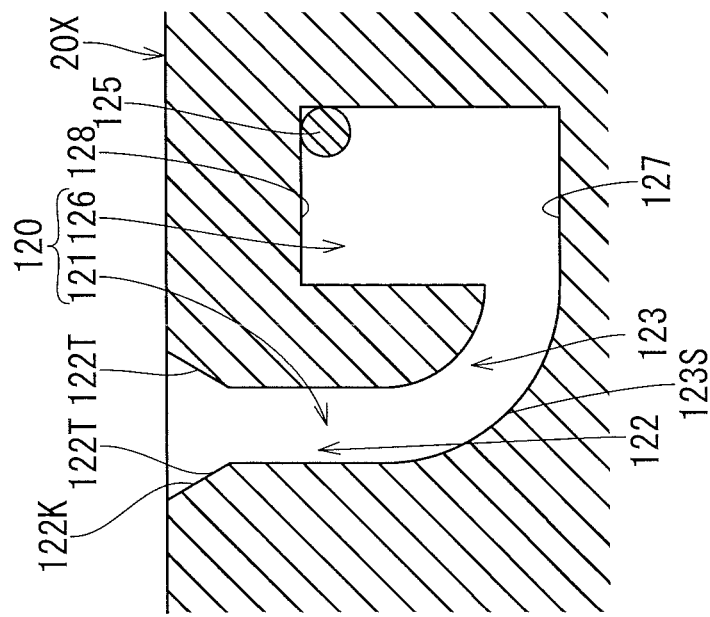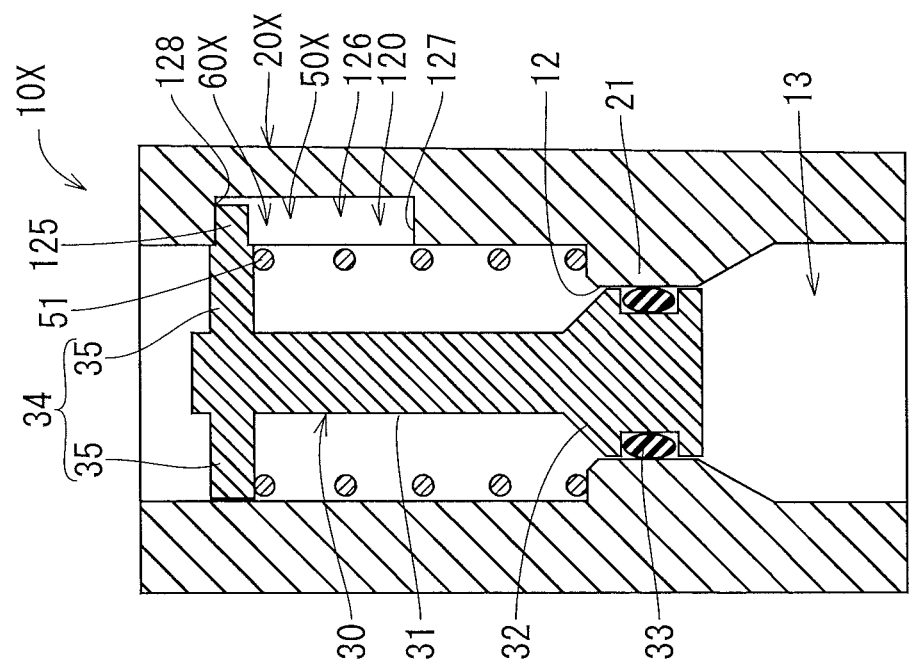
FIG. 13 (A)
FIG. 13 (B)

VALVE

TECHNICAL FIELD

The present disclosure relates to a valve.

BACKGROUND ART

Valves with a tubular body attached at one end thereof to a valve attachment hole of an object to which the valve is mounted, and a valve opening inside this tubular body opened and closed by a valve member, have been known before (see, for example, Patent Literature 1). The valve member of this valve has a valve body part extended from a shaft part in a flange like shape, and when the valve is in the closed state, the valve body part is abutted to the open edge of the valve opening from one end side of the tubular body.

RELATED ART DOCUMENTS

Patent Documents

Patent Document 1: Japanese Unexamined Patent Application Publication No. JP 2015-512826 A (paragraph [0028] and FIG. 1A1 and FIG. 1B1)

SUMMARY OF THE INVENTION

Problems to be Solved by the Invention

Since the conventional valve described above does not allow the valve member alone to be removed from the other side in the axial direction of the tubular body, it was necessary to remove the entire valve from the object to which it is mounted when, for example, replacing the valve member.

Means of Solving the Problems

To solve the problem described above, the valve according to one aspect of the present invention includes a tubular body having one end to be attached to a valve attachment hole provided in an object to which the valve is mounted; a valve opening formed inside the tubular body; a valve member passing through inside the tubular body to open and close the valve opening; a shaft part provided to the valve member and extending along an axial direction of the tubular body; a valve body part provided to the valve member and radially extending out from the shaft part to slidably fit in the valve opening; a valve chamber provided to the tubular body in a part adjacent to the valve opening on a one end side in the axial direction and connecting the valve opening and the valve attachment hole in a state wherein the valve body part is entirely accommodated therein; a valve body holding mechanism that holds the valve body part inside the valve opening wherein the valve member is not subjected to an operating force for causing the valve member to move in the axial direction of the tubular body, and that allows the valve body part to separate from the valve opening wherein the valve member receives an operating force that moves the valve member toward the one end side of the tubular body; and a retaining mechanism capable of changing between a restricting state wherein the valve member is prevented from coming off from an other end side of the tubular body, and a permitting state wherein the valve member is allowed to come off from the other end side of the tubular body.

BRIEF DESCRIPTION OF THE DRAWINGS

FIG. 13(A) is a cross-sectional side view of a valve according to a fourth embodiment, and (B) is a cross-sectional side view of the vicinity of a receiving recess and an engaging pin viewed in inside of a tubular body in a circumferential development view of the tubular body.

MODE FOR CARRYING OUT THE INVENTION

First Embodiment

Figure 1:
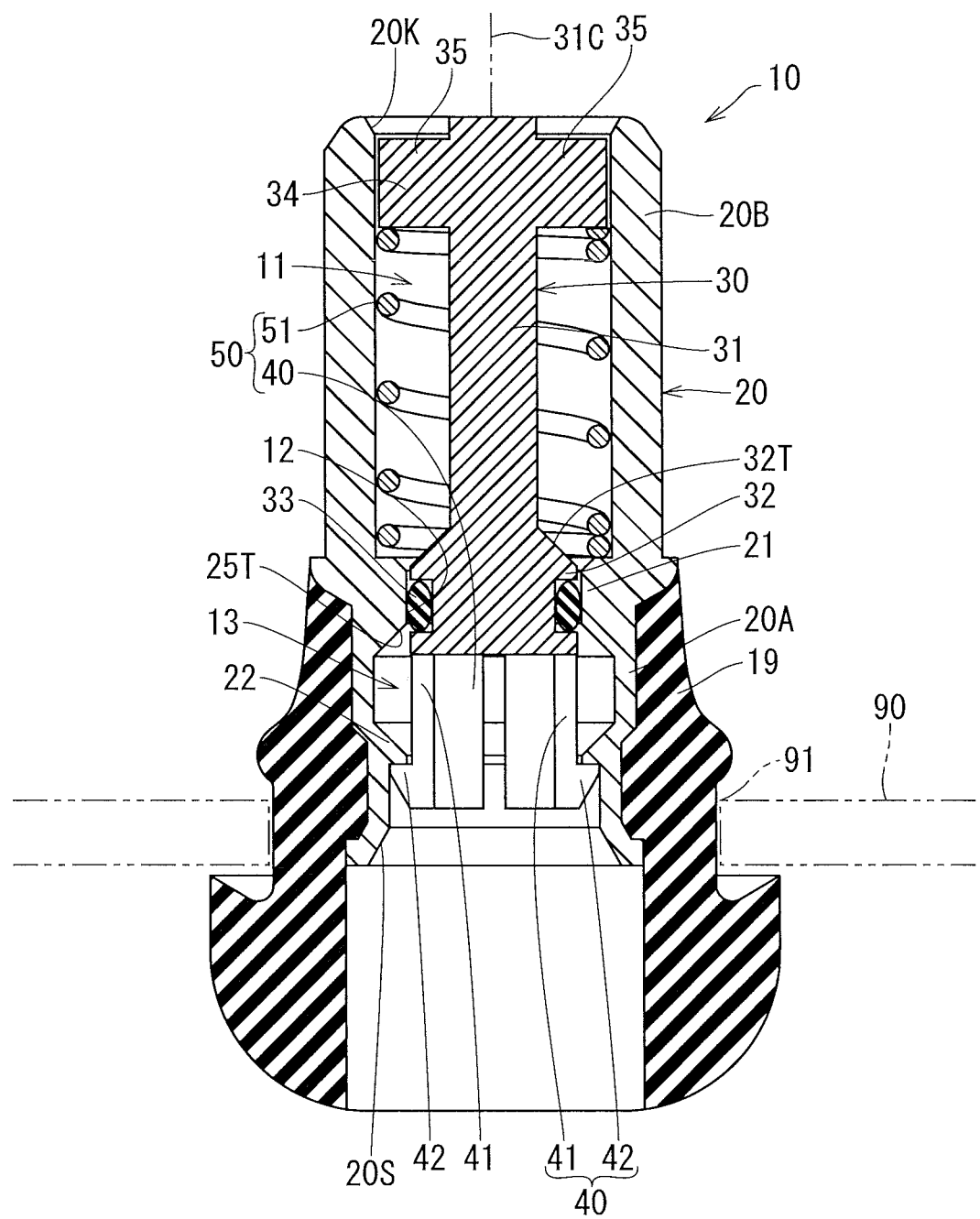
FIG. 1 is a cross-sectional side view of a valve according to a first embodiment of the present disclosure.

As shown in FIG. 1, the valve 10 of the first embodiment is attached to a valve attachment hole 91 formed in the rim 90 of a tire wheel (which corresponds to an "object to which the valve is mounted" in the claims). The valve 10 has a tubular body 20 and a valve member 30 passing through the inside of the tubular body 20.

Figure 2:
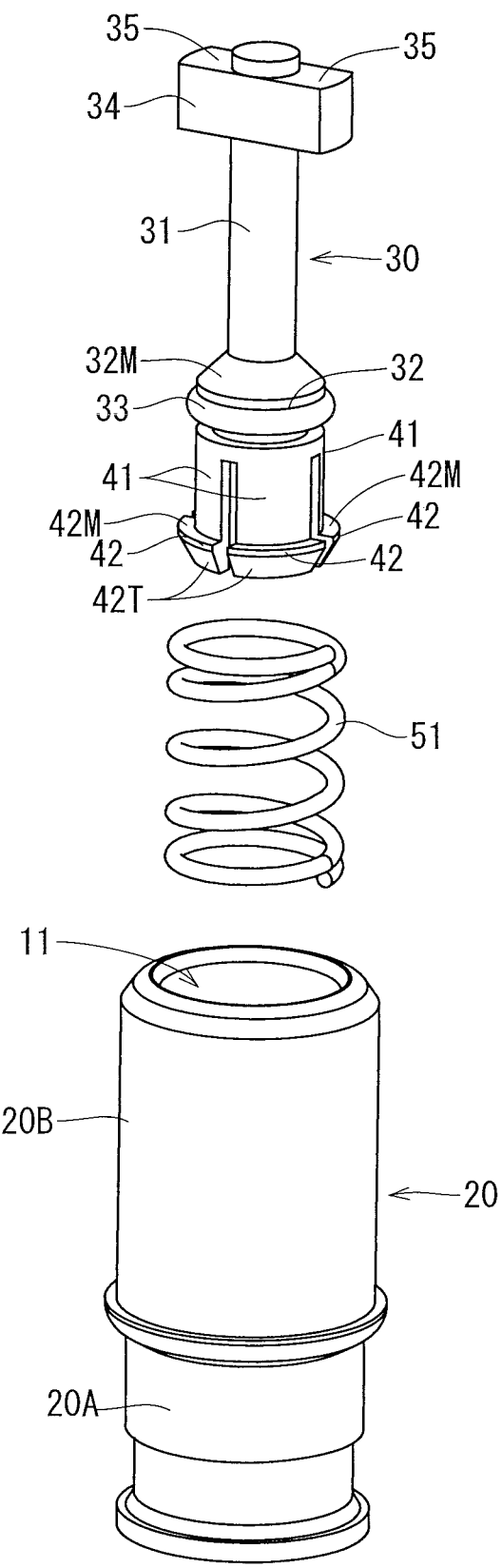
FIG. 2 is an exploded perspective view of the valve.

As shown in FIG. 1 and FIG. 2, in this embodiment, the tubular body 20 is made of metal, for example, and has a small-diameter tube part 20A on one axial end side and a large-diameter tube part 20B on the other end side. A tubular elastic cover member 19 is fixedly attached to the outer circumferential surface of the small-diameter tube part 20A. The elastic cover member 19 is press-fit into the valve attachment hole 91 of the rim 90 so that an end portion on one side of the tubular body 20 is attached to the valve attachment hole 91. The other end of the tubular body 20 protrudes from the rim 90 into the tire wheel and constitutes a part for injecting air into the tire. Hereinafter, one axial end and the other end of the tubular body 20 shall be referred to as the distal end and the proximal end of the tubular body 20, respectively.

An inside part of the tubular body 20 constitutes a fluid flow passage 11. Two axially spaced annular protrusions that constrict the fluid flow passage 11 are provided on the inner circumferential surface of the tubular body 20.

Figure 3:
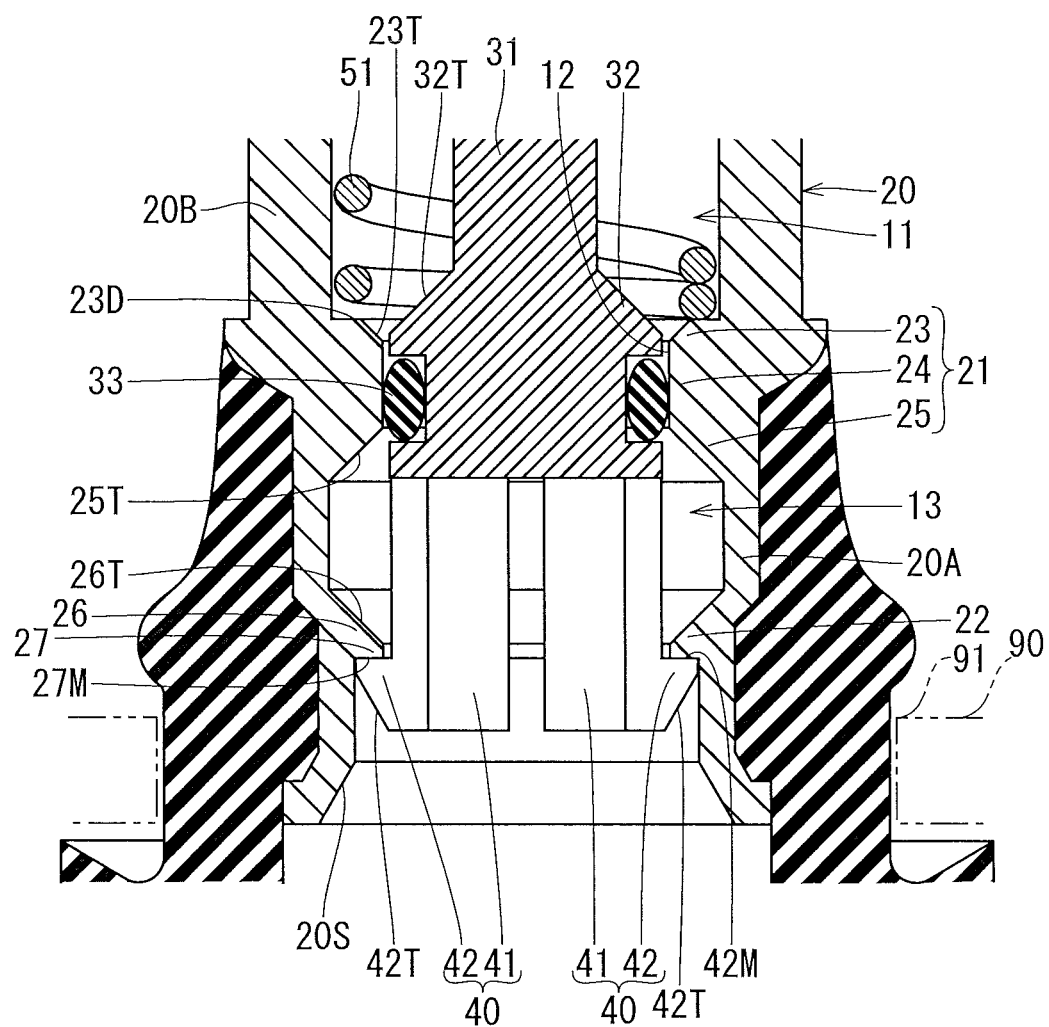
FIG. 3 is an enlarged cross-sectional side view of the vicinity of a first annular protrusion and a second annular protrusion of the valve.

As shown in FIG. 3, one of the two annular protrusions, the first annular protrusion 21 on the proximal side of the tubular body 20, includes a reducing-diameter section 23 where the inside diameter reduces toward the distal side of the tubular body 20, a straight section 24 extending along the axial direction of the tubular body 20 where the inside diameter is constant, and an increasing-diameter section 25 where the inside diameter increases toward the distal side of the tubular body 20, successively from the proximal side of the tubular body 20.

The inside of the straight section 24 constitutes the valve opening 12 of the valve 10. Part of the fluid flow passage 11 from the valve opening 12 to the distal end constitutes a valve chamber 13. The inner circumferential surface of the reducing-diameter section 23 constitutes a valve opening proximal tapered surface 23T that gradually comes closer to the center axis of the tubular body 20 toward the distal side of the tubular body 20. The inner circumferential surface of the increasing-diameter section 25 constitutes a valve opening distal tapered surface 25T that gradually comes closer to the center axis of the tubular body 20 toward the proximal side of the tubular body 20. The end face of the reducing-diameter section 23 on the proximal side of the tubular body 20 is a step surface 23D that is substantially perpendicular to the axial direction of the tubular body 20.

One of the two annular protrusions, i.e., the second annular protrusion 22 on the distal side of the tubular body 20, is provided on the inner face of the valve chamber 13. The second annular protrusion includes a reducing-diameter section 26 where the inside diameter reduces toward the distal side of the tubular body 20, and a distal small-diameter part 27 where the inside diameter is constant, successively from the proximal side of the tubular body 20.

The inner circumferential surface of the reducing-diameter section 26 constitutes a guide tapered surface 26T that gradually comes closer to the center axis of the tubular body 20 toward the distal side of the tubular body 20. One side of the distal small-diameter part 27 facing the distal side of the tubular body 20 is an upright surface 27M that is substantially perpendicular to the axial direction of the tubular body 20. The distal small-diameter part 27 has an inside diameter substantially equal to the diameter of the valve opening 12.

As shown in FIG. 1 and FIG. 2, the valve member 30 has a shaft part 31 extending along the axial direction of the tubular body 20, and a valve body part 32 extending out radially from the shaft part 31. The valve body part 32 is made up of a main body extending from the entire circumference of the distal end of the shaft part 31, and an O-ring 33 fitted to an outer circumferential portion of the main body. One side of the main body of the valve body part facing the proximal side of the tubular body 20 is a valve body tapered surface 32T gradually reduced in diameter toward the proximal side.

In this embodiment, the valve member 30 includes a hook part 34 extending radially from the proximal end in the axial direction of the shaft part 31. The hook part 34 has a pair of extensions 35 extending out from the shaft part 31 to the opposite directions. The distance from the center axis 31C of the shaft part 31 to the extended tip of each extension 35 is substantially the same as the radius of the inner circumferential surface of the tubular body 20 in the part surrounding the pair of extensions 35 (more specifically, the part closer to the proximal end than the first annular protrusion 21).

In the valve 10 of this embodiment, the valve opening 12 of the tubular body 20 is opened and closed by the valve member 30 moving along the axial direction of the tubular body 20. When the valve body part 32 fits in the valve opening 12 in the valve 10, the O-ring 33 of the valve body part 32 seals between the valve opening 12 and the valve body part 32, whereby the valve opening 12 is closed (see FIG. 1). The valve body part 32 is freely slidable in the valve opening 12. When the valve body part 32 comes out of the valve opening 12 and the entire valve body part 32 is accommodated in the valve chamber 13, the valve opening 12 is opened (see FIG. 4). In the open state, there is a gap S between the inner face of the valve chamber 13 and the valve body part 32 for a fluid to flow through, so that the valve attachment hole 91 of the rim 90 comes into communication with the valve opening 12. In this embodiment, the valve opening distal tapered surface 25T allows the fluid that has flowed through the fluid flow passage 11 from the proximal side of the tubular body 20 to flow smoothly into the valve chamber 13.

As shown in FIG. 1, the valve 10 is provided with a valve body holding mechanism 50 (see FIG. 1) that sets the valve body part 32 in position in the axial direction of the tubular body 20 and holds it inside the valve opening 12 when no operating force is being applied to the valve member 30. More specifically, the valve body holding mechanism 50 includes a spring 51 that biases the valve member 30 toward the proximal side of the tubular body 20, and a retainer piece 40 projecting from the valve member 30 in the form of a projection to prevent the valve member 30 from moving further to the proximal side of the tubular body 20.

The spring 51 is a compression coil spring held between the first annular protrusion 21 (i.e., step surface 23D (see FIG. 3)) and the hook part 34 of the valve member 30 inside the tubular body 20. The spring 51 has a larger inside diameter than the outside diameter of the valve body part 32.

As shown in FIG. 1 and FIG. 2, the retainer piece 40 has projections 41 extending from the valve body part 32 along the axial direction of the tubular body 20, and engaging pawls 42 extending from the projections 41 radially outward of the tubular body 20.

The projections 41 extend from the distal end of the valve member 30 toward the distal side of the tubular body 20 and are cantilevered on the valve body part 32.

The engaging pawls 42 extend out from the protruding distal ends of the projections 41. The engaging pawls 42 have a triangular cross section, i.e., their protruding amount from the projections 41 when viewed in the width direction of the projection 41 decreases gradually toward the protruding distal ends of the projections 41. One side of the engaging pawls 42 facing the proximal side of the tubular body 20 is an upright surface 42M that is substantially perpendicular to the projections 41. One side of the engaging pawls 42 facing the distal side of the tubular body 20 is an outer inclined surface 42T that comes closer to the projections 41 toward the distal side.

The projections 41 are elastically deformable such as to bend radially inward of the tubular body 20. When the projections 41 are in their natural state wherein they are not deformed, the engaging pawls 42 are aligned with the second annular protrusion 22 in the axial direction of the tubular body 20. When the engaging pawl 42 (more particularly, the upright surface 42M of the engaging pawl 42) of the retainer piece 40 in the natural state abuts on the second annular protrusion 22 of the tubular body 20 (more particularly, the upright surface 27M of the second annular protrusion 22) from the distal side of the tubular body 20, the valve member 30 is prevented from moving further to the proximal side of the tubular body 20 (see FIG. 1 and FIG. 7(A)).

By deforming elastically radially inward of the tubular body 20, the projections 41 allow the entire retainer piece 40 including the engaging pawls 42 to be accommodated inside the second annular protrusion 22. As mentioned above, in this embodiment, the smallest inside diameter of the first annular protrusion 21 (i.e., the diameter of the valve opening 12) is substantially the same as the smallest inside diameter of the second annular protrusion 22 (inside diameter of the distal small-diameter part). Therefore, the retainer piece 40 can be fitted inside the first annular protrusion 21, too, by elastic deformation.

In this embodiment, a plurality of retainer pieces 40 are provided around the axis of the shaft part 31 substantially at equal distance in the shape of a circular arc coaxial with the shaft part 31. The engaging pawls 42 have an outside diameter that is smaller than the diameter of the inner circumferential surface of the tubular body 20 in the part of the second annular protrusion 22 closer to the proximal end (except for the first annular protrusion 21). In this embodiment, the retainer pieces 40 and the valve member 30 are made of resin and formed in one piece.

When the valve member 30 is subjected to an operating force that moves the valve member 30 toward the distal side of the tubular body 20 against the biasing force of the spring 51 (e.g., force pressing the valve member 30 toward the distal side applied with a tool for injecting a fluid), the engaging pawls 42 separate from the second annular protrusion 22, and the valve body part 32 comes out of the valve opening 12 (i.e., the valve opening 12 is opened. See FIG. 4). The valve body holding mechanism 50 allows the valve body part 32 to come out of the valve opening 12 in this way when the valve member 30 is subjected to the operating force that moves the valve member 30 toward the distal side of the tubular body 20.

Figure 4:
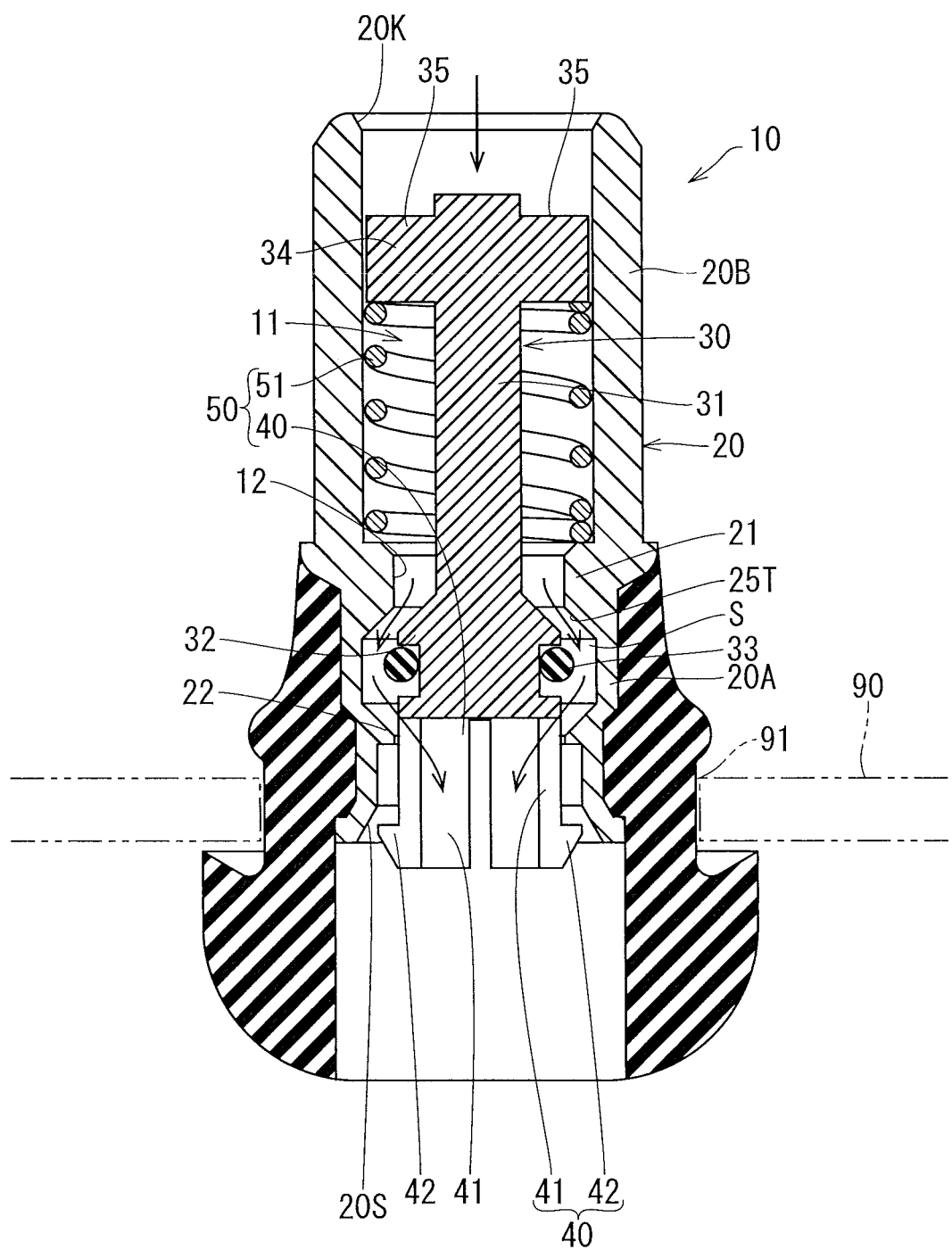
FIG. 4 is a cross-sectional side view of the valve when the valve opening has reached an open state.

When the operating force mentioned above is removed, the biasing force of the spring 51 causes the valve body part 32 to return into the valve opening 12 so that the valve opening 12 is closed, as shown in the transition from FIG. 4 to FIG. 1.

In this embodiment, the valve opening distal tapered surface 25T, which gradually comes closer to the center axis of the tubular body 20 toward the proximal side of the tubular body 20, is provided on the inner face of the valve chamber 13 at an end where there is the valve opening 12 (i.e., the inner circumferential surface of the increasing-diameter section 25 of the first annular protrusion 21). It is therefore easier for the valve body part 32 to return into the valve opening 12 as this valve opening distal tapered surface 25T guides the valve body part 32. Since the valve body part 32 is also guided into the valve opening 12 by the valve body tapered surface 32T of the valve body part 32, it is even easier for the valve body part 32 to return into the valve opening 12. When the valve opening 12 is opened, the engaging pawls 42 stick out from the distal end of the tubular body 20 (see FIG. 4). In this embodiment, the tubular body 20 has a distal opening tapered surface 20S at the open edge of the distal end where the diameter is gradually reduced toward the proximal side, so that the engaging pawls 42 can readily return into the tubular body 20.

Figure 5:
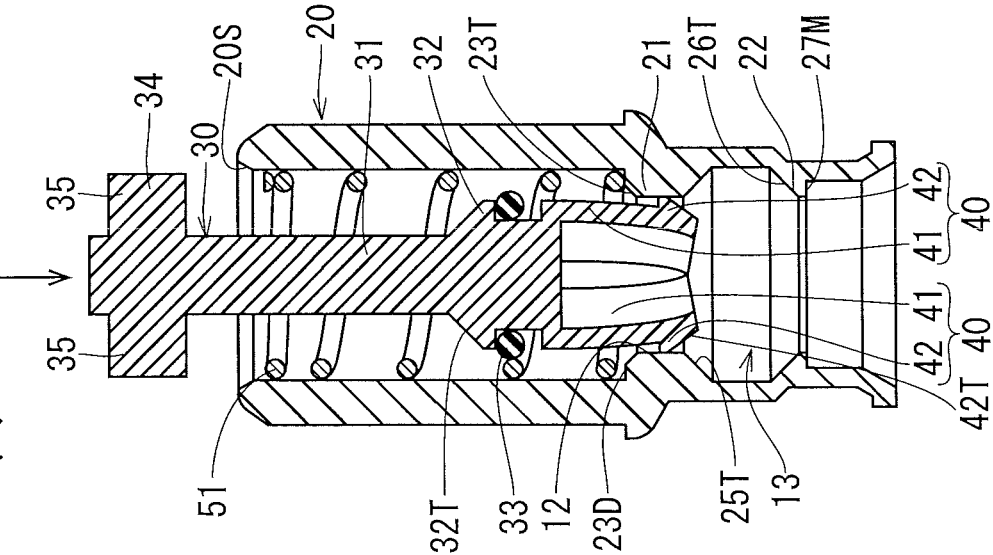
FIG. 5(A) is a cross-sectional side view of a retainer piece when the valve member is inserted into a tubular body and its engaging pawls abut on the first annular protrusion, and (B) is a cross-sectional side view of the retainer piece elastically deforming as it passes through the inside of the first annular protrusion.
Figure 5:
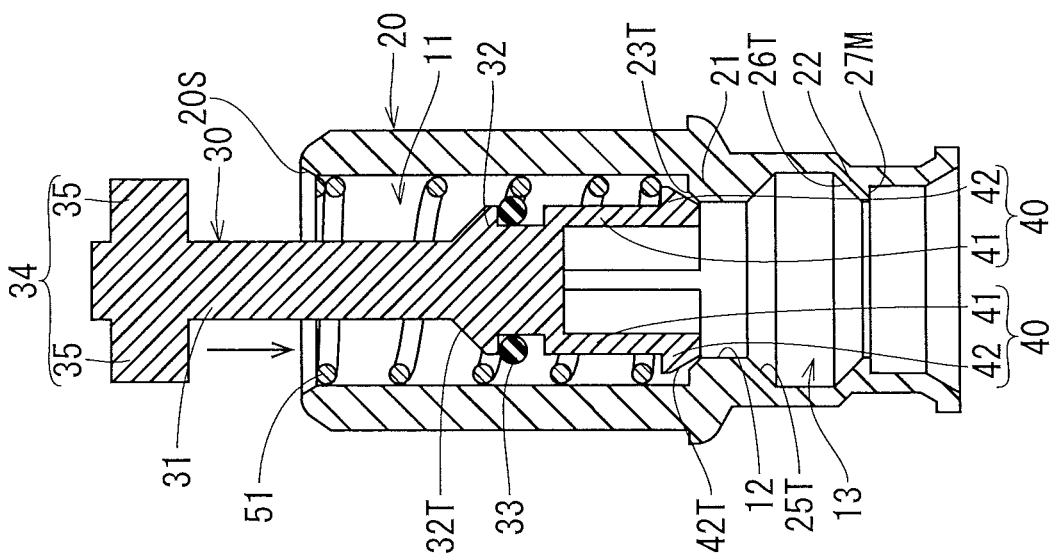

The valve member 30 is assembled to the tubular body 20 in the following manner. As shown in FIG. 2 and FIG. 5(A), the valve member 30 is inserted into the tubular body 20 from the proximal side. At this time, the spring 51 is set between the hook part 34 of the valve member 30 and the engaging pawls 42 of the retainer piece 40 so that it coils around the valve member 30.

Since the outside diameter of the engaging pawls 42 is larger than the inside diameter of the valve opening 12 in this embodiment, the engaging pawls 42 abut on the first annular protrusion 21 when the valve member 30 is inserted into the tubular body 20 (see FIG. 5(A)). In this embodiment, as mentioned above, the retainer piece 40 is elastically deformable in the radial direction of the tubular body 20 so that it fits inside the first annular protrusion 21. Thus, the engaging pawls 42 can ride over the first annular protrusion 21 and pass through the valve opening 12 (see FIG. 5(B)). In this process, the valve opening proximal tapered surface 23T guides the retainer piece 40 into the valve opening 12, so that the retainer piece 40 can be readily inserted into the valve opening 12. The retainer piece 40 is also guided by the outer inclined surface 42T of the engaging pawls 42 into the valve opening 12, so that the retainer piece 40 can be readily inserted into the valve opening 12. When the engaging pawls 42 of the retainer piece 40 enter into the valve opening 12, the spring 51 is caught on the step surface 23D of the tubular body 20 and retained on the proximal side of the tubular body 20 relative to the valve opening 12.

Figure 6A:
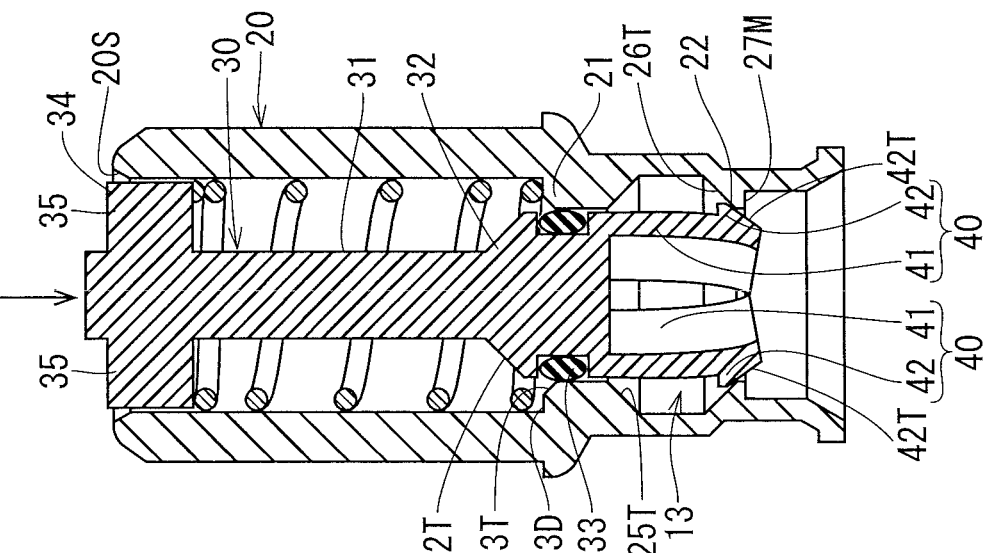
FIG. 6(A) is a cross-sectional side view of the retainer piece when the engaging pawls have abutted on the second annular protrusion, and (B) is a cross-sectional side view of the retainer piece elastically deforming as it passes through the inside of the second annular protrusion.
Figure 6B:
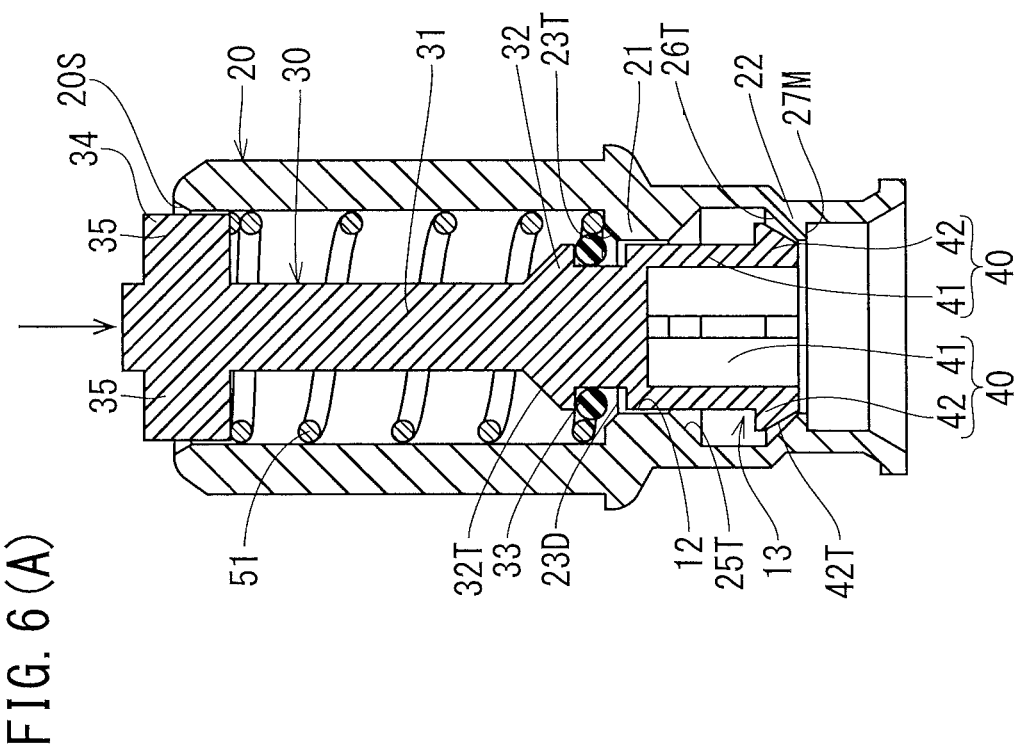

When the engaging pawls 42 have passed through the valve opening 12, the retainer piece 40 elastically restores radially outward of the tubular body 20. Since the outside diameter of the engaging pawls 42 is larger than the inside diameter of the second annular protrusion 22, the engaging pawls 42 abut on the second annular protrusion 22 when the valve member 30 is inserted deeper into the tubular body 20 (see FIG. 6(A)). In this embodiment, as mentioned above, the retainer piece 40 is elastically deformable in the radial direction of the tubular body 20 so that it also fits inside the second annular protrusion 22, so that the engaging pawls 42 can pass through the inside of the second annular protrusion 22 (see FIG. 6(B)). At this time, the guide tapered surface 26T of the second annular protrusion 22 guides the engaging pawls 42 radially inward of the tubular body 20, allowing the engaging pawls 42 to readily elastically deform radially inward. The engaging pawls 42 are also guided by the outer inclined surface 42T of the engaging pawls 42 radially inward of the tubular body 20, so that the engaging pawls 42 can easily elastically deform radially inward.

When the engaging pawls 42 are inserted into the second annular protrusion 22, the valve body part 32 is inserted into the valve opening 12 inside the first annular protrusion 21. In this process, the valve opening proximal tapered surface 23T guides the O-ring 33 of the valve body part 32, so that the valve body part 32 can be readily inserted into the valve opening 12.

Figure 7:
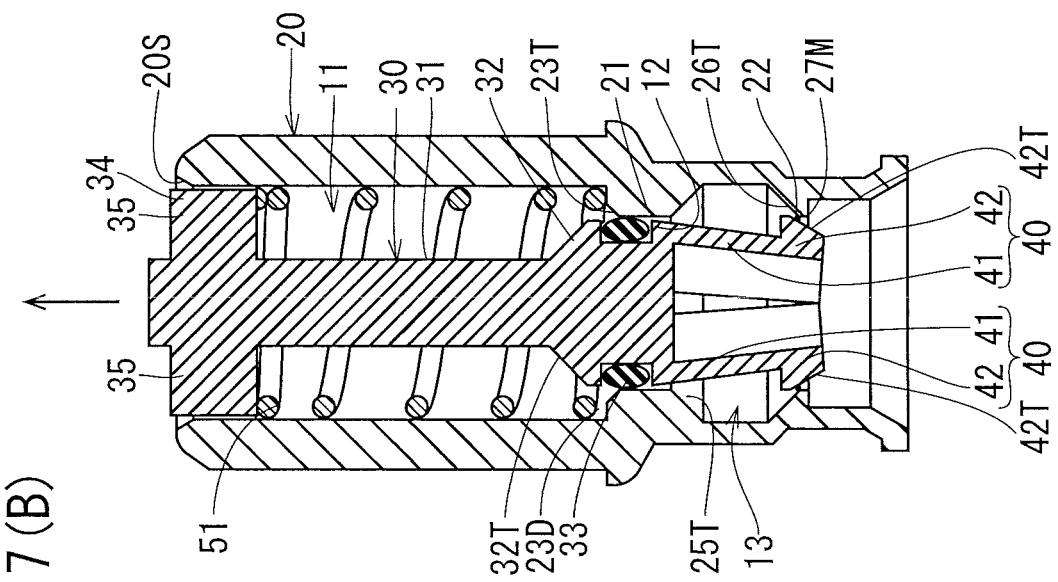
FIG. 7(A) is a cross-sectional side view of the retainer piece when the engaging pawls have engaged the second annular protrusion, and (B) is a cross-sectional side view of the retainer piece passing through the inside of the second annular protrusion in a plastically deformed state, as the valve member is pulled out toward the proximal side of the tubular body.
Figure 7:
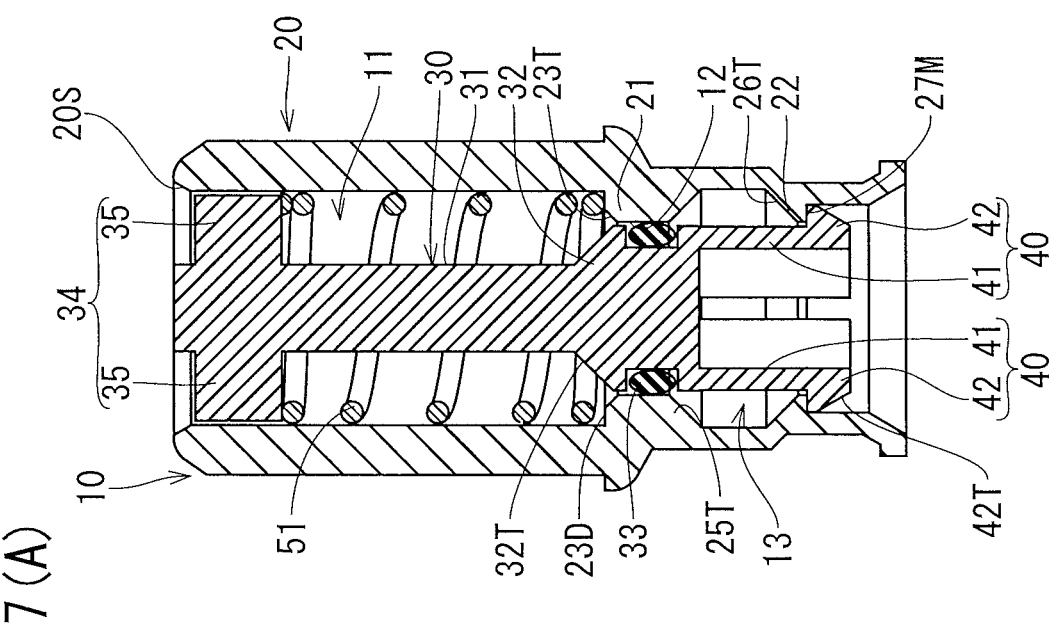

When the engaging pawls 42 have passed through the inside of the second annular protrusion 22, the retainer piece 40 elastically restores radially outward of the tubular body 20 (see FIG. 7(A)). At this time, the spring 51 is compressed between the first annular protrusion 21 of the tubular body 20 and the hook part 34 of the valve member 30. As a result, the spring 51 applies a biasing force on the valve member 30 toward the proximal side of the tubular body 20. When the engaging pawls 42 of the retainer piece 40 abut on the second annular protrusion 22 from the distal side of the tubular body 20, the valve member 30 is set in position relative to the tubular body 20. In this state, the valve body part 32 fits in the valve opening 12 so that the valve opening 12 is closed. The valve member 30 is thus assembled to the tubular body 20.

In this embodiment, the retainer piece 40 has the plurality of engaging pawls 42 substantially equally spaced around the axis of the shaft part 31, which makes it easy to align the shaft part 31 coaxially with the valve opening 12, so that the valve body part 32 can be readily inserted into the valve opening 12. The pair of extensions 35 also facilitates the coaxial alignment of the shaft part 31 and the valve opening 12 since the distance from the center axis 31C of the shaft part 31 to the extended tip of each extension 35 is substantially the same as the radius of the inner circumferential surface of the tubular body 20 in the part surrounding the pair of extensions 35, so that the valve body part 32 can be readily inserted into the valve opening 12. The tubular body 20 is provided with a proximal opening tapered surface 20K at the open edge of the proximal end where the diameter is gradually reduced toward the distal side, and this tapered surface facilitates insertion of the hook part 34 of the valve member 30 into the tubular body 20.

Figure 9:
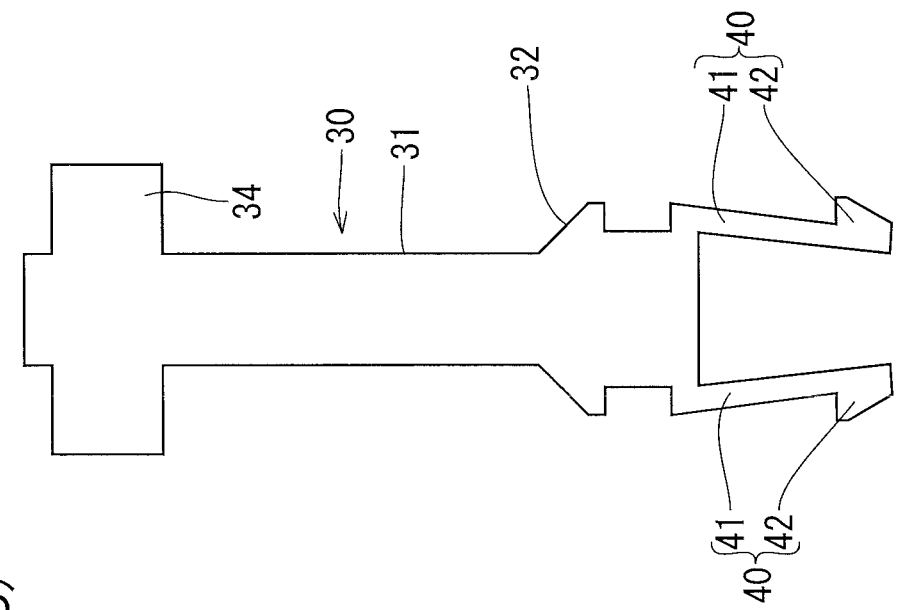
FIG. 9(A) is a conceptual diagram showing forces applied to the valve member and retainer piece when the valve member is pulled out to the proximal side of the tubular body, and (B) is a conceptual diagram of the valve member and the retainer piece that has bent.
Figure 9:
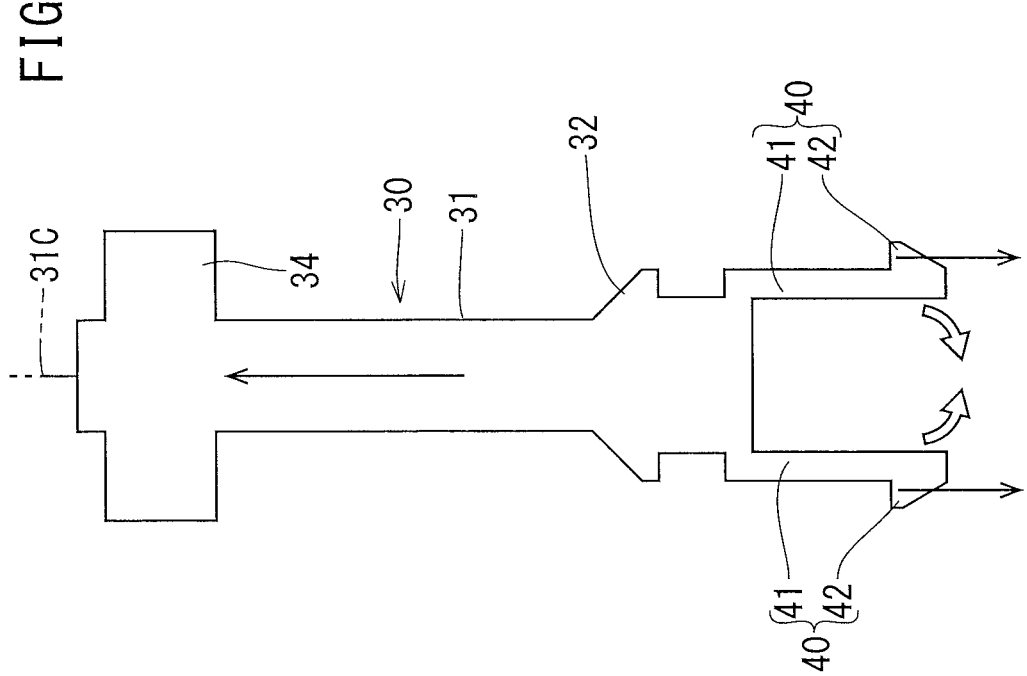

The valve 10 of this embodiment allows the valve member 30 alone to be replaced from the proximal side of the tubular body 20, with the distal end part of the tubular body 20 being attached to the rim 90 of the tire wheel. The engaging pawls 42 of the retainer piece 40 are in engagement with the second annular protrusion 22 in the valve 10. Since the retainer piece 40 is cantilevered on the valve member 30, when an operating force of pulling out the valve member 30 to the proximal side of the tubular body 20 is applied, the retainer piece 40 plastically deforms radially inward (more specifically, bends). As a result, the retainer piece 40 can be brought inside of the second annular protrusion 22 (see FIG. 7(B)). The engaging pawls 42 and the second annular protrusion 22 engage each other at positions offset from the center axis 31C of the shaft part 31 in the valve 10 (see FIG. 9(A)). When the operating force that pulls out the shaft part 31 to the proximal side is applied, the retainer piece 40 is pushed toward the center axis 31C of the shaft part 31 (radially inward) because of the turning force, which brings about the plastic deformation of the retainer piece 40 (see FIG. 9(B)).

Figure 8:
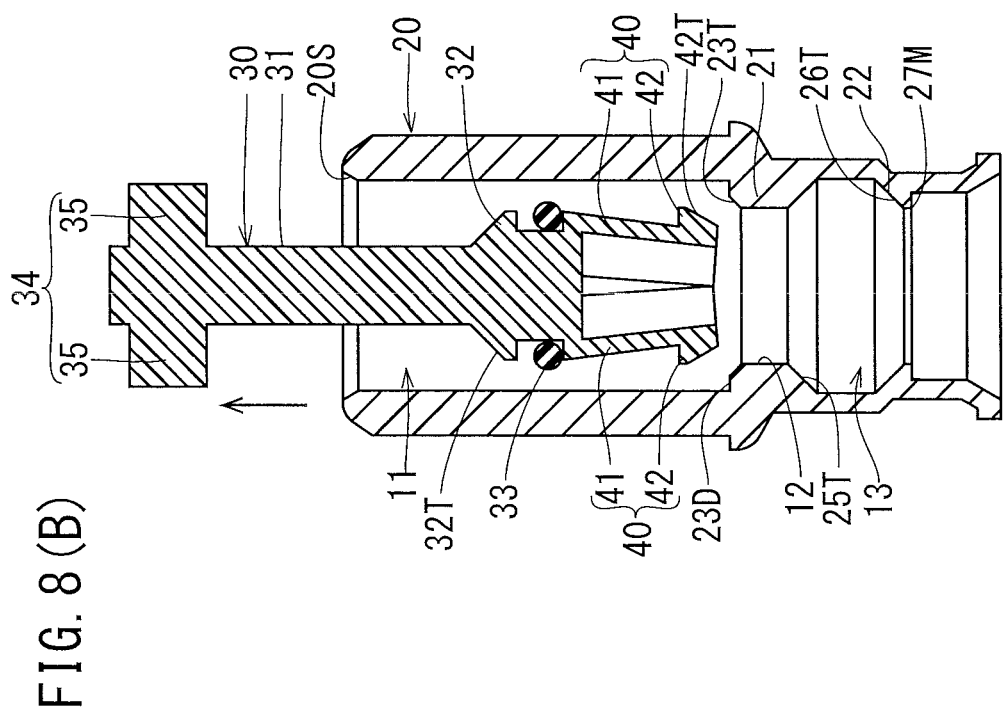
FIG. 8(A) is a cross-sectional side view of the retainer piece passing through the inside of the first annular protrusion in a plastically deformed state, as the valve member is pulled out to the proximal side of the tubular body, and (B) is a cross-sectional side view of the retainer piece after having passed through the inside of the first annular protrusion.
Figure 8:
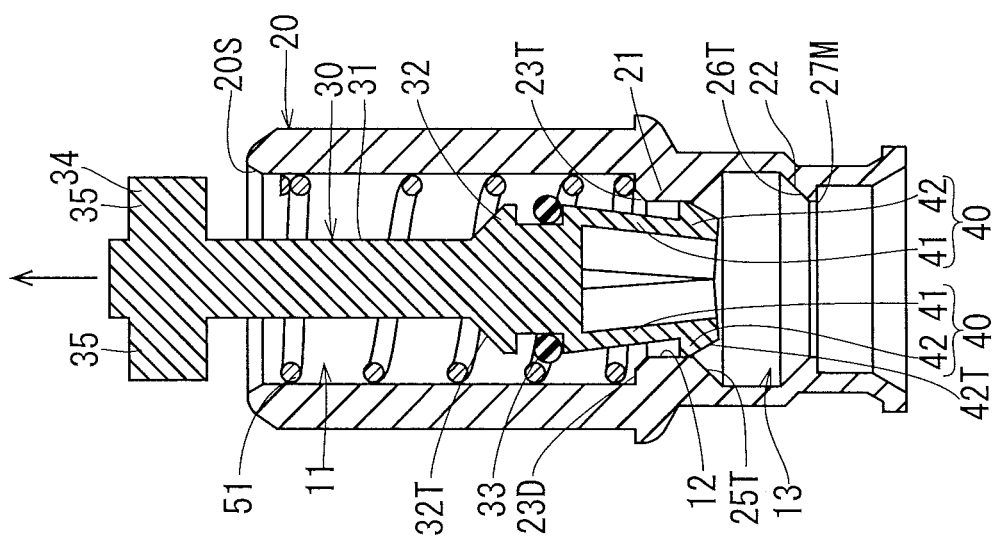

Once the retainer piece 40 deforms plastically and comes into the second annular protrusion 22, the retainer piece 40 can be taken out of the second annular protrusion 22 to the proximal side of the tubular body 20 (see FIG. 8(A) and FIG. 8(B)). The retainer piece 40 deforms plastically in this way so that the retainer piece 40 can pass through the inside of the first annular protrusion 21 (i.e., valve opening 12), too. The valve 10 allows the valve member 30 alone to be removed from the proximal side of the tubular body 20 in this way, because the retainer piece 40 can pass through the first annular protrusion 21 and the second annular protrusion 22 to the proximal side of the tubular body 20 by undergoing plastic deformation.

When the retainer piece 40 is in the natural state (shown in FIG. 7(A)), the valve 10 of this embodiment prevents the valve member 30 from coming out from the proximal side of the tubular body 20. When the retainer piece 40 is in the plastically deformed state (shown in FIG. 7(B)) wherein it has deformed plastically so that it fits inside the first annular protrusion 21 and the second annular protrusion 22, the valve member 30 is allowed to come out from the proximal side of the tubular body 20. Namely, the retainer piece 40 constitutes a retaining mechanism 60 that transitions between a restricting state (natural state) shown in FIG. 7(A) and a permitting state (plastically deformed state) shown in FIG. 7(B).

Even if the projections 41 break (i.e., torn apart midway) instead of bending, or if the engaging pawls 42 break (i.e., chip) due to the force exerted during the operation of pulling out the valve member 30 from the proximal side of the tubular body 20, the valve member 30 can still be drawn out from the proximal side of the tubular body 20.

A replacement valve member 30 is assembled from the proximal side of the tubular body 20 in the manner described in the foregoing.

Since the valve member 30 alone can be pulled out from the proximal side of the tubular body 20 in this embodiment, the entire valve 10 need not be removed from the rim 90 when replacing the valve member 30. When the O-ring 33 has worn out, for example, the valve member 30 alone, to which the O-ring 33 is attached, can be replaced. The hook part 34 allows the valve member 30 to be pulled out easily with a tool engaged with the hook part 34.

The second annular protrusion 22 in this embodiment corresponds to an "annular protrusion" in the claims. The valve opening distal tapered surface 25T and the guide tapered surface 26T correspond to a "first tapered surface" and a "second tapered surface", respectively, in the claims.

Second Embodiment

Figure 10:
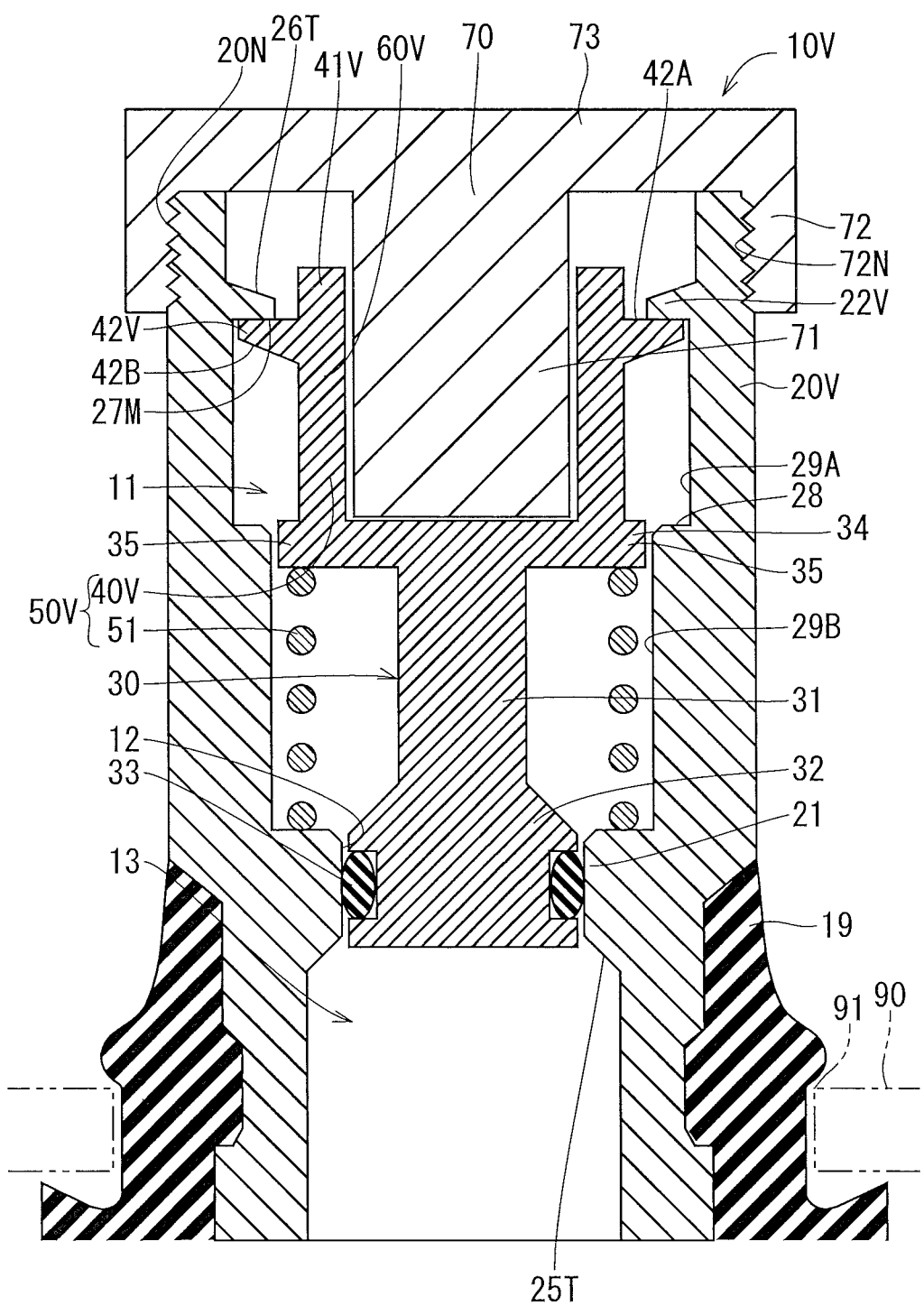
FIG. 10 is a cross-sectional side view of a valve according to a second embodiment.

FIG. 10 shows the valve 10V of the second embodiment. The valve 10V of this embodiment has the arrangement of the second annular protrusion 22 and retainer piece 40 altered from that of the valve 10 of the first embodiment described in the foregoing.

The tubular body 20V of the valve 10V has the second annular protrusion 22V on the inner circumferential surface thereof closer to the proximal end of the tubular body 20V than the first annular protrusion 21. One side of the second annular protrusion 22V facing the distal side of the tubular body 20V is an upright surface 27M that is substantially perpendicular to the axial direction of the tubular body 20V. One side of the second annular protrusion 22V facing the proximal side of the tubular body 20V is a guide tapered surface 26T that is radially reduced to gradually come closer to the center axis of the tubular body 20V toward the distal side of the tubular body 20V.

In this embodiment, a proximal increasing-diameter section 28 is provided on the inner circumferential surface of the tubular body 20V between the first annular protrusion 21 and the second annular protrusion 22V where the fluid flow passage 11 is radially enlarged toward the proximal side of the tubular body 20V. Namely, the fluid flow passage 11 is provided with a proximal large-diameter hole 29A located closer to the proximal end of the tubular body 20V than the proximal increasing-diameter section 28, and a medium-diameter hole 29B between the proximal increasing-diameter section 28 and the first annular protrusion 21. The valve 10V does not have the second annular protrusion 22V inside the valve chamber 13. The valve chamber 13 is straight, with a constant inside diameter, from the valve opening distal tapered surface 25T to the distal end of the tubular body 20V.

Similarly to the valve 10 of the first embodiment, the valve opening 12 of the valve 10V is opened and closed by the valve body part 32 slidingly moving in the valve opening 12. The pair of extensions 35 are received in the medium-diameter hole 29B of the tubular body 20V when the valve body part 32 fits in the valve opening 12 so that the valve opening 12 is closed. The distance from the center axis of the shaft part 31 to the extended tip of each extension 35 is substantially the same as the radius of the medium-diameter hole 29B.

The valve body holding mechanism 50V of the valve 10V includes a spring 51 and a retainer piece 40V. The spring 51 is a compression coil spring held between the first annular protrusion 21 and the hook part 34 of the valve member 30 similarly to the first embodiment. The retainer piece 40V extends from the proximal end of the valve member 30 toward the proximal side of the tubular body 20V.

The projections 41V of the retainer piece 40V each protrude from the extensions 35 of the hook part 34 (more particularly, close to the extending distal ends of the extensions 35) of the valve member 30.

The engaging pawls 42V of the retainer piece 40V extend out from a midway point in the protruding direction of the projections 41V (more particularly, closer to the distal end). The engaging pawls 42V have a triangular cross section, i.e., their protruding amount from the projections 41V increases gradually toward the protruding distal ends of the projections 41V. One side of the engaging pawls 42V facing the proximal side of the tubular body 20V is an upright surface 42A that is substantially perpendicular to the projections 41V. One side of the engaging pawls 42V facing the distal side of the tubular body 20V is an outer inclined surface 42B that comes closer to the projections 41V toward the distal side of the shaft part 31.

The projections 41V are elastically deformable radially inward of the tubular body 20V, this elastic deformation enabling the entire retainer piece 40V to be accommodated inside the second annular protrusion 22V. When the projections 41V are in their natural state wherein they are not deformed, the engaging pawls 42V are aligned with the second annular protrusion 22 in the axial direction of the tubular body. When the retainer piece 40V is in the natural state and its engaging pawls 42V abut on the second annular protrusion 22V, the valve member 30 is prevented from moving further to the proximal side of the tubular body 20V (see FIG. 10).

The valve 10V of this embodiment is provided with a cap 70 that shuts the proximal end opening of the tubular body 20V. The cap 70 is made up of a substantially disc-like base part 73 that has a larger diameter than the tubular body 20V and shuts the proximal end opening of the tubular body 20V, a center protrusion 71 protruding from a central part of the base part 73 toward the distal side of the tubular body 20V, and an outer wall part 72 protruding from the outer edge of the base part 73 toward the distal side of the tubular body 20V. The center protrusion 71 is inserted into the tubular body 20V and faces the retainer piece 40V from inside in the radial direction of the tubular body 20V. The outer wall part 72 overlaps an outer circumferential surface of the proximal end of the tubular body 20V and is provided with internal threads 72N on the inner circumferential surface thereof. The cap 70 is fixed to the tubular body 20V by screw engagement between the internal threads 72N of the cap 70 and external threads 20N provided on the outer circumferential surface of the proximal end of the tubular body 20V. The cap 70 may be configured to abut on the valve member 30 from the proximal side of the tubular body when the cap 70 is fixed to the tubular body 20V. In this case, the valve member 30 is prevented from moving further to the proximal side of the tubular body 20V by the cap 70, too.

Other features of the valve 10V are the same as those of the valve 10 of the first embodiment described in the foregoing. The components of the valve 10V similar to those of the valve 10 are given the same reference signs and will not be described again.

In this embodiment, the valve member 30 is assembled to the tubular body 20V in the following manner. The valve member 30 is inserted into the tubular body 20V from the proximal side. At this time, the spring 51 is set to be wound around the valve member 30 at a part closer to the distal end than the hook part 34. Alternatively, the spring 51 alone may be inserted into the tubular body 20V before the insertion of the valve member 30.

When the valve member 30 is inserted into the tubular body 20V, the valve body part 32 enters into the valve opening 12 and fits in the valve opening 12. The engaging pawls 42V abut on the second annular protrusion 22V. The retainer piece 40V is elastically deformable in the radial direction of the tubular body 20V to fit inside the second annular protrusion, so that the engaging pawls 42V can ride over the second annular protrusion 22V and pass through the inside of the second annular protrusion 22V. At this time, the guide tapered surface 26T of the second annular protrusion 22V and the outer inclined surface 42B of the engaging pawls 42V guide the engaging pawls 42V radially inward of the tubular body 20V, allowing the engaging pawls 42V to readily elastically deform.

When the engaging pawls 42V have passed through the inside of the second annular protrusion 22V, the projections 41V elastically return radially outward of the tubular body 20V. At this time, the spring 51 is compressed between the first annular protrusion 21 of the tubular body 20V and the hook part 34 of the valve member 30, so that the valve member 30 is biased toward the proximal side of the tubular body 20V by the biasing force of the spring 51. When the engaging pawls 42V abut on the second annular protrusion 22V from the distal side of the tubular body 20V, the valve member 30 is set in position relative to the tubular body 20V. In this state, the valve body part 32 fits in the valve opening so that the valve opening 12 is closed.

Next, the internal threads 72N of the cap 70 are screwed on the external threads 20N of the tubular body 20V so as to close the proximal end opening of the tubular body 20V with the cap 70. The valve member 30 is thus assembled to the tubular body 20V.

Figure 11:
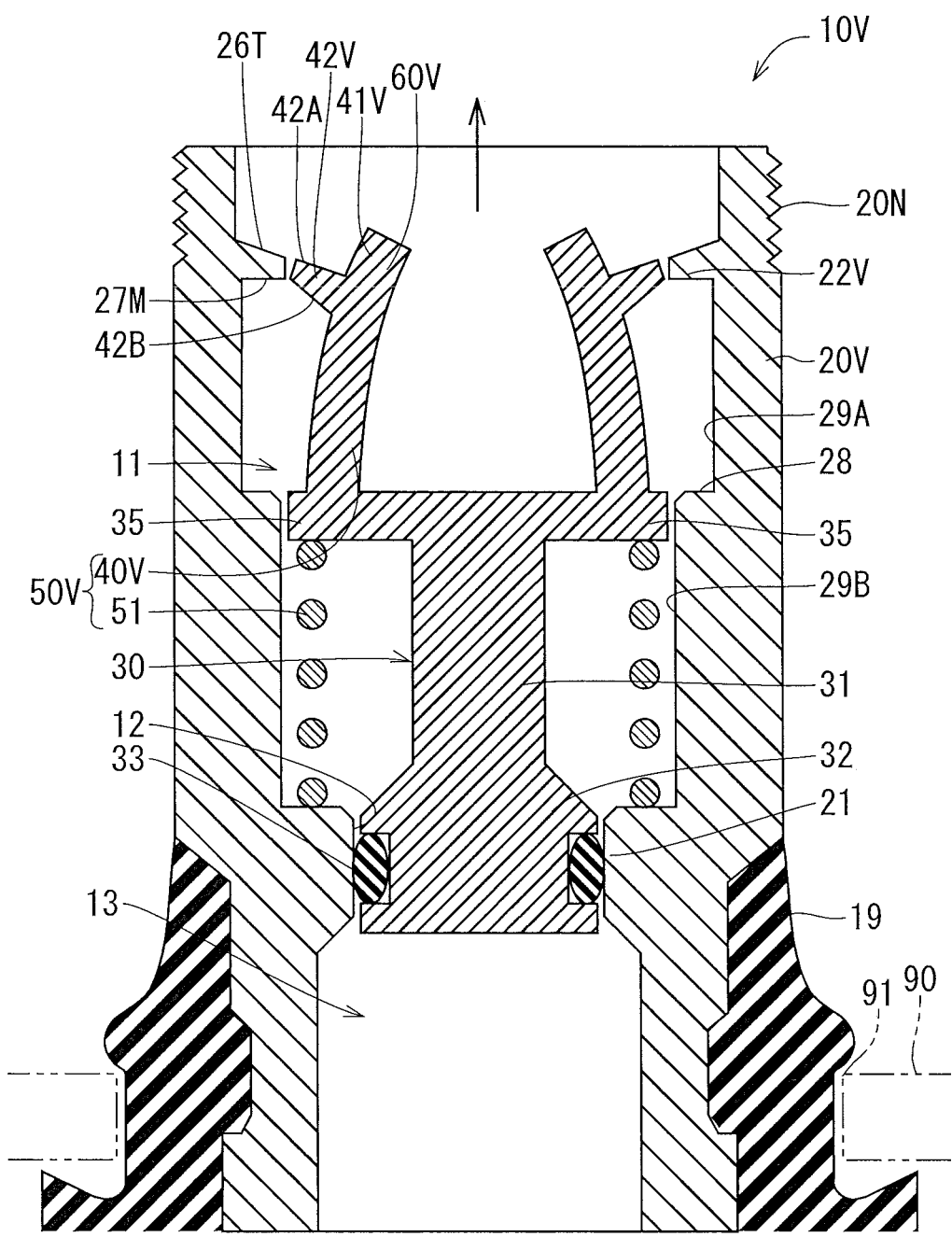
FIG. 11 is a cross-sectional side view of a valve member and a retainer piece as the valve member is pulled out of a tubular body, with the retainer piece being elastically deformed.

Similarly to the valve 10 of the first embodiment, the valve 10V of this embodiment allows the valve member 30 alone to be replaced from the proximal side of the tubular body 20V, with the distal end part of the tubular body 20V being attached to the rim 90 of the tire wheel. The retainer piece 40V of the valve 10V of this embodiment can be brought inside of the second annular protrusion 22V by pinching the tips of the retainer piece 40V together, for example, to cause the retainer piece 40V to elastically deform radially inward (see FIG. 11) after the cap 70 has been removed. As the retainer piece 40V can be released toward the proximal side of the tubular body 20V through the second annular protrusion 22V, the valve member 30 can be removed from the proximal side of the tubular body 20V. Since the valve member 30 at this time is pushed toward the proximal side of the tubular body 20V by the biasing force of the spring 51, it is made easy to pull out the valve member 30 from the proximal side of the tubular body 20V. Since the valve member 30 is removed from the proximal side of the tubular body 20V by elastically deforming the retainer piece 40V in this embodiment, the retainer piece 40V is reusable. By providing a gap between the end portions of the projections 41V on the proximal side of the tubular body 20V and the inner circumferential surface of the second annular protrusion 22V, it is made easy to pinch the projections 41V together to cause elastic deformation thereof.

The cap 70 of the valve 10V of this embodiment is attached to the tubular body 20V such as to oppose the retainer piece 40V from inside in the radial direction of the tubular body 20V. Therefore, with the cap 70 attached to the tubular body 20V, the retainer piece 40V is prevented from deforming radially inward of the tubular body 20V when the operation of opening the valve opening 12 is not performed, so that unwanted disengagement between the retainer piece 40V and the second annular protrusion 22V is prevented.

When the retainer piece 40V is in the natural state wherein it is not elastically deformed (shown in FIG. 10), the valve 10V of this embodiment assumes a restricting state wherein it prevents the valve member 30 from coming out from the proximal side of the tubular body 20V. The retainer piece 40V assumes a permitting state wherein it allows the valve member 30 to come out from the proximal side of the tubular body 20V when it is in the elastically deformed state (shown in FIG. 11) wherein it fits inside the second annular protrusion 22V. Namely, the retainer piece 40V corresponds to the "retaining mechanism" in the claims.

Third Embodiment

Figure 12:
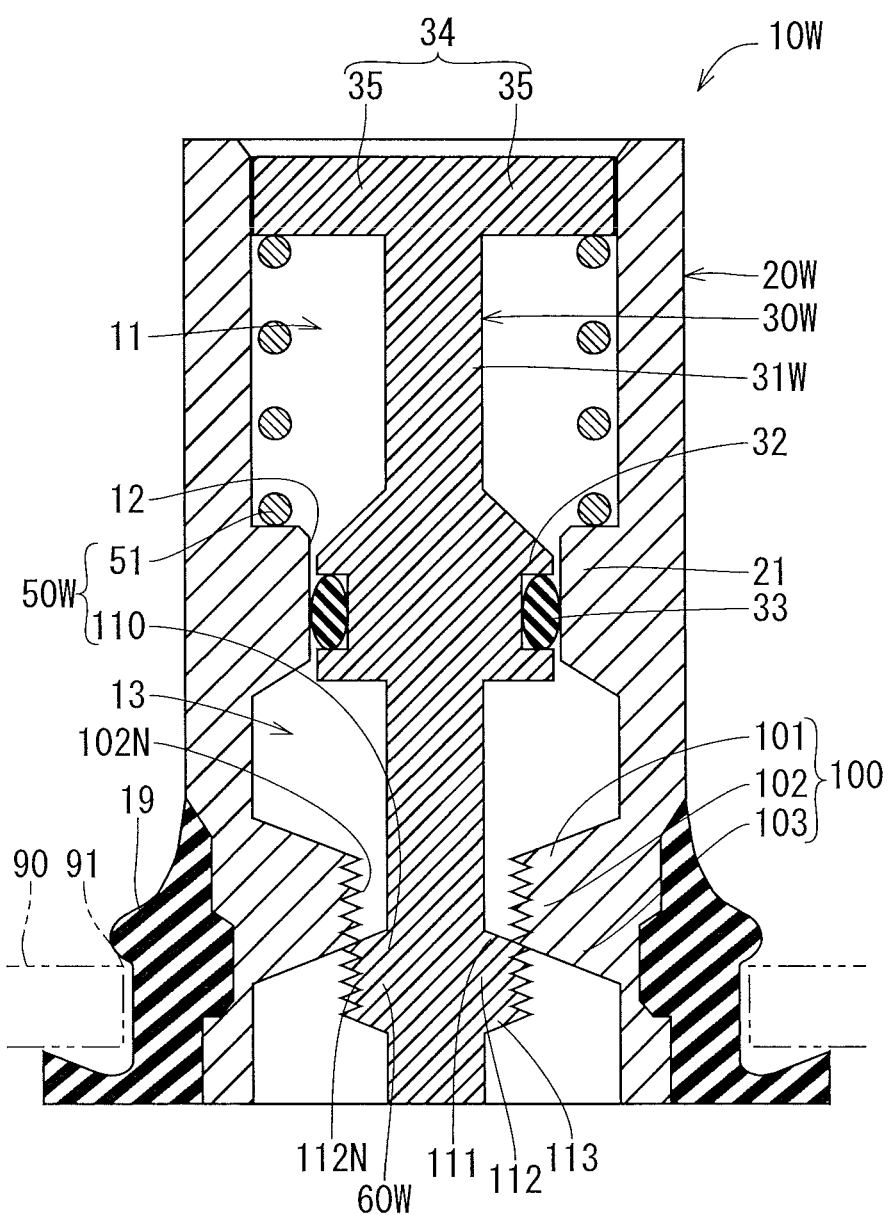
FIG. 12 is a cross-sectional side view of a valve according to a third embodiment.

FIG. 12 shows the valve 10W of the third embodiment. The valve 10W of this embodiment has the valve body holding mechanism 50 and retaining mechanism 60 altered from those of the valve 10 of the first embodiment described in the foregoing.

In this embodiment, the second annular protrusion 100 of the tubular body 20W includes a reducing-diameter section 101 where the inside diameter reduces toward the distal side of the tubular body 20W, a straight section 102 extending along the axial direction of the tubular body, and an increasing-diameter section 103 where the inside diameter increases toward the distal side of the tubular body, successively from the proximal side of the tubular body 20W.

Internal threads 102N are formed on the inner circumferential surface of the straight section 102 of the second annular protrusion 100. The inner circumferential surface of the reducing-diameter section 101 is tapered so that it gradually comes closer to the center axis of the tubular body toward the distal side of the tubular body 20W. The inner circumferential surface of the increasing-diameter section 103 is tapered so that it gradually comes closer to the center axis of the tubular body toward the proximal side of the tubular body 20W.

The valve body part 32 of the valve member 30W extends out midway through the axial direction of the shaft part 31W. The shaft part 31W has such a length that it protrudes out from the second annular protrusion 100 toward the distal side of the tubular body 20W.

Similarly to the valve 10 of the first embodiment, the valve opening 12 is opened and closed by the valve body part 32 slidingly moving in the valve opening 12 in the valve 10W of this embodiment.

In this embodiment, the valve body holding mechanism 50W includes a retainer protrusion 110 radially extending out all around from the shaft part 31W (more particularly, from a portion of the shaft part 31W closer to the distal end than the valve body part 32), instead of the retainer piece 40 of the first embodiment described above.

The retainer protrusion 110 includes an increasing-diameter section 111 where the outside diameter increases toward the distal side of the tubular body 20W, a straight section 112 extending along the axial direction of the tubular body 20W, and a reducing-diameter section 113 where the outside diameter decreases toward the distal side of the tubular body 20W, successively from the proximal side of the tubular body 20W.

External threads 112N are formed on the outer circumferential surface of the straight section 112 of the retainer protrusion 110. The straight section 112 has a smaller outside diameter than the valve opening 12. The outer circumferential surface of the increasing-diameter section 111 is tapered so that it gradually comes closer to the center axis of the tubular body 20W toward the proximal side of the tubular body 20W. The outer circumferential surface of the reducing-diameter section 113 is tapered so that it gradually comes closer to the center axis of the tubular body 20W toward the distal side of the tubular body 20W.

In this embodiment, the retainer protrusion 110 is positioned closer to the distal end of the tubular body 20W than the second annular protrusion 100 when the valve body part 32 fits in the valve opening 12 so that the valve opening 12 is closed. When the valve opening 12 is closed, the external threads 112N of the retainer protrusion 110 and the internal threads 102N of the second annular protrusion 100 are not engaged with each other. When the external threads 112N of the retainer protrusion 110 abut on the internal threads 102N of the second annular protrusion 100 from the distal side, the valve member 30W is prevented from moving further toward the proximal side of the tubular body 20W.

Other features of the valve 10W are the same as those of the valve 10 of the first embodiment described in the foregoing. The components of the valve 10W similar to those of the valve 10 are given the same reference signs and will not be described again.

In this embodiment, the valve member 30W is assembled to the tubular body 20W in the following manner. The valve member 30W is inserted into the tubular body 20W from the proximal end. At this time, the spring 51 is set to be wound around the valve member 30W at a part closer to the distal end than the hook part 34. Alternatively, the spring 51 alone may be inserted into the tubular body 20W before the insertion of the valve member 30W.

When the valve member 30W is inserted into the tubular body 20W from the proximal side, the retainer protrusion 110 passes through the valve opening 12, since the retainer protrusion 110 has a smaller outside diameter than the inside diameter of the valve opening. The external threads 112N of the retainer protrusion 110 then abut on the internal threads 102N of the second annular protrusion 100. In this state, by rotating the valve member 30W to one side around the axis, the external threads 112N can be screwed to the internal threads 102N. As the valve member 30W is inserted into the tubular body 20W while being turned further to the one side around the axis of the valve member 30W, the external threads 112N of the retainer protrusion 110 disengage from the internal threads 102N of the second annular protrusion 100, so that the retainer protrusion 110 separates from the second annular protrusion 100 to the distal side of the tubular body 20W. As the biasing force of the spring 51 causes the retainer protrusion 110 to abut on the second annular protrusion 100 from the distal side of the tubular body 20W, the valve member 30W is set in position in the axial direction of the tubular body 20W, and the valve body part 32W is held inside the valve opening 12. The valve member 30W is thus assembled to the tubular body 20W.

Similarly to the valve 10 of the first embodiment, the valve 10W of this embodiment allows the valve member 30W alone to be replaced from the proximal side of the tubular body 20W, with the distal end part of the tubular body 20W being attached to the rim 90 of the tire wheel. In this embodiment, the valve member 30W can be removed from the proximal side of the tubular body 20W by rotating the valve member 30W in the opposite direction from when it was assembled.

In this embodiment, the retaining mechanism 60W is configured by the retainer protrusion 110. The state of the retainer protrusion 110 positioned closer to the distal end of the tubular body 20W than the second annular protrusion 100 after the external threads 112N of the retainer protrusion 110 have disengaged from the internal threads 102N of the second annular protrusion 100 corresponds to a "restricting state" of the retaining mechanism 60W. The state of the external threads 102N and internal threads 112N in screw engagement corresponds to a "permitting state" of the retaining mechanism 60W.

Fourth Embodiment

Figure 14B:
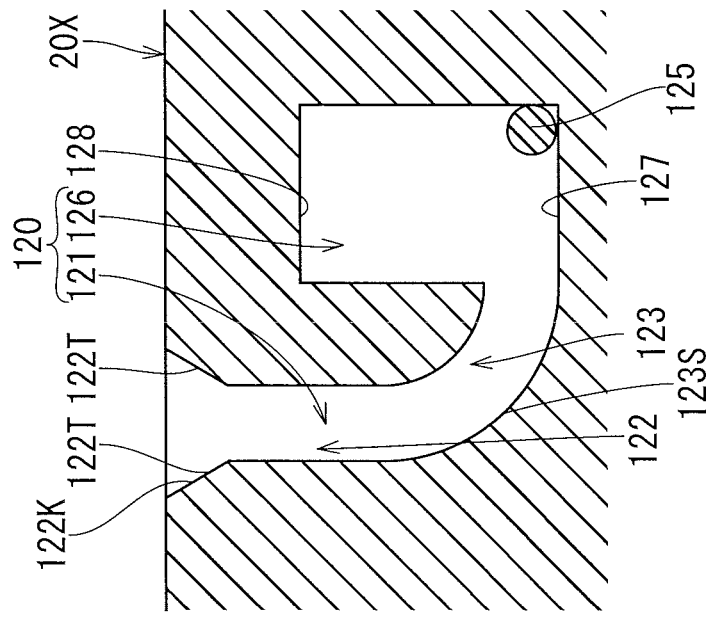
FIG. 14(A) is a cross-sectional side view of the valve when a valve opening has reached the open state, and (B) is a cross-sectional side view of the vicinity of a receiving recess and an engaging pin viewed in inside of a tubular body in a circumferential development view of the tubular body.
Figure 14A:
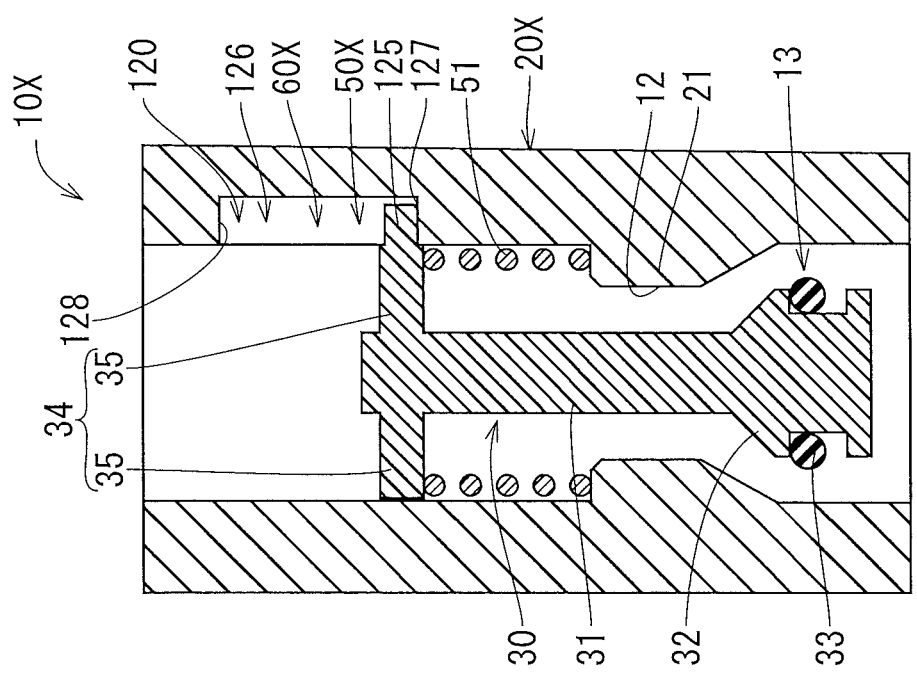
Figure 15:
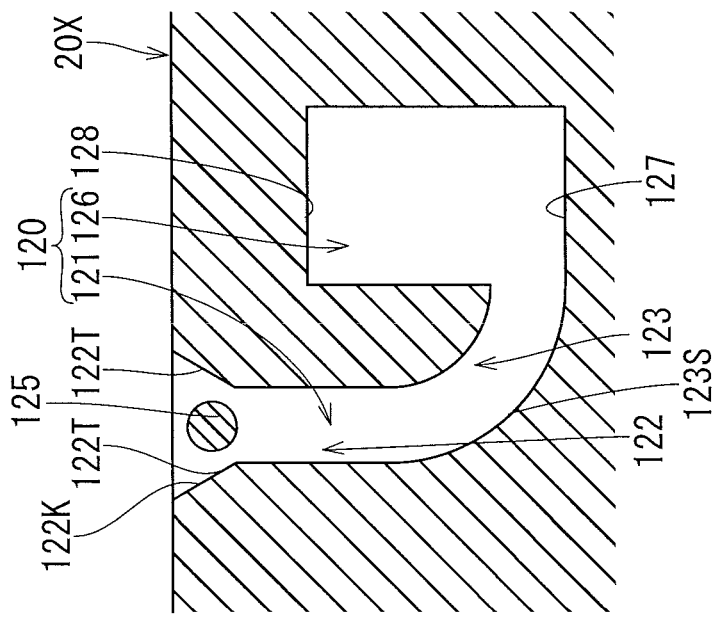
FIG. 15(A) is a cross-sectional side view of the valve when the engaging pin is received in the proximal end opening of a guide groove, and (B) is a cross-sectional side view of the vicinity of the receiving recess and engaging pin viewed in inside of the tubular body in a circumferential development view of the tubular body.
Figure 15:
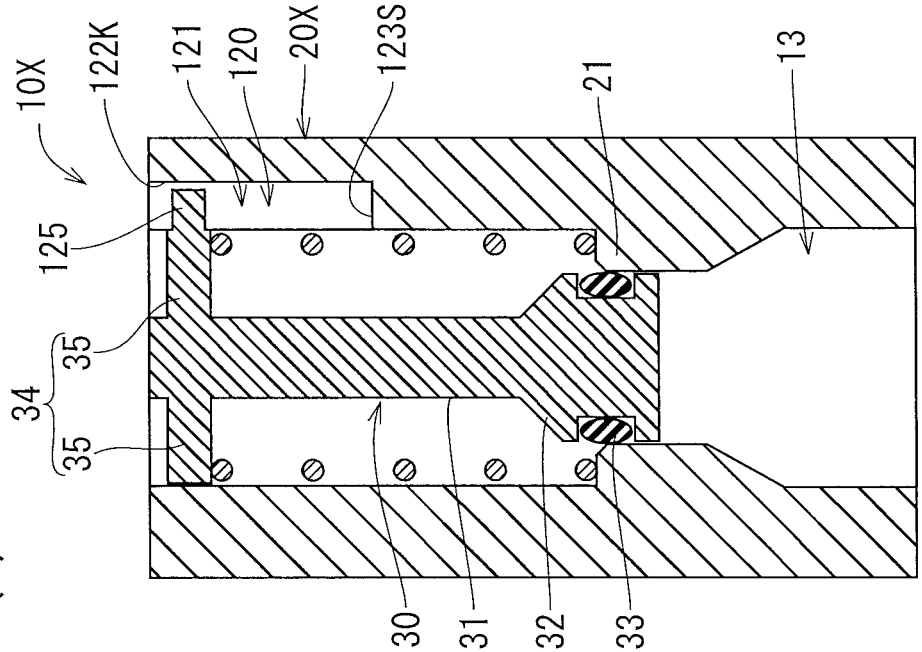

FIG. 13 to FIG. 15 show the valve 10X of the fourth embodiment. The valve 10X of this embodiment has the valve body holding mechanism 50 and retaining mechanism 60 altered from those of the valve 10 of the first embodiment described in the foregoing. The valve 10X of this embodiment is not provided with the second annular protrusion 22.

In this embodiment, as shown in FIG. 13(A) and FIG. 13(B), a receiving recess 120 is provided in the inner circumferential surface of the tubular body 20X closer to the proximal end of the tubular body 20X than the first annular protrusion 21. The receiving recess 120 has a guide groove 121 and a receiving cavity 126 aligned along the circumferential direction of the tubular body 20X.

The guide groove 121 has a straight groove portion 122 and a curved groove portion 123. The straight groove portion 122 extends from the proximal end of the tubular body 20X toward the distal side. The curved groove portion 123 extends from the straight groove portion and is curved in a circular arc to approach the receiving cavity 126 toward the distal side of the tubular body 20X. A tapered slope 122T where the width of the guide groove 121 gradually reduces toward the distal side of the tubular body 20X is provided to the straight groove portion 122 at an open edge of the proximal end opening 122K that opens at the proximal end of the tubular body 20X.

The receiving cavity 126 is rectangular elongated along the axial direction of the tubular body 20X when viewed in the radial direction of the tubular body 20X. The curved groove portion 123 of the guide groove 121 connects to the receiving cavity 126 in the circumferential direction of the tubular body 20X at the distal end in the axial direction of the tubular body 20X. A distal end face 127 of inner faces of the receiving cavity 126 positioned at the distal end in the axial direction of the tubular body 20X is smoothly continuous with an outer circumferential portion 123S of the curved groove portion 123. The length of the receiving cavity 126 in the axial direction of the tubular body 20X is shorter than the length of the guide groove 121. The receiving cavity 126 extends toward the proximal side of the tubular body 20X to a midway point of the straight groove portion 122. The width of the receiving cavity 126 in the circumferential direction of the tubular body 20X is wider than the groove width of the guide groove 121.

The hook part 34 of the valve member 30 includes a pair of extensions 35 as with the first embodiment. In this embodiment, an engaging pin 125 extends from the extending tip of one of the pair of extensions 35 radially outward of the tubular body 20X. The engaging pin 125 is received in the receiving recess 120 such as to be movable therein. More specifically, the engaging pin 125 can move from the proximal end opening 122K of the guide groove 121 to the receiving cavity 126, as well as move along the axial direction of the tubular body 20X inside the receiving cavity 126. The engaging pin 125 has a circular cross section, for example.

Similarly to the valve 10 of the first embodiment, the valve opening 12 is opened and closed by the valve body part 32 slidingly moving in the valve opening 12 in the valve 10X of this embodiment.

The valve body holding mechanism 50X of the valve of this embodiment includes the spring 51, engaging pin 125, and receiving cavity 126. The spring 51 is a compression coil spring held between the first annular protrusion 21 of the tubular body 20X and the hook part 34 of the valve member 30 similarly to the first embodiment.

In this embodiment, the spring 51 biases the valve member 30 (i.e., engaging pin 125) toward the proximal side of the tubular body 20X. When the engaging pin 125 abuts on a proximal end face 128 of inner faces of the receiving cavity 126 positioned at the proximal end in the axial direction of the tubular body 20X, the valve member 30 is prevented from moving further toward the proximal side of the tubular body 20X. In this state, the valve body part 32 is located inside the valve opening 12 so that the valve opening 12 is closed.

When the valve member 30 is subjected to an operating force that causes the valve member 30 to move toward the distal side of the tubular body 20X against the biasing force of the spring 51, the engaging pin 125 moves toward the distal side of the tubular body 20X inside the receiving cavity 126 so that the valve body part 32 separates from the valve opening 12 (i.e., the valve opening 12 is opened. See FIG. 14(A) and FIG. 14(B)).

When the operating force mentioned above is removed, the biasing force of the spring 51 causes the valve body part 32 to return into the valve opening 12, while the engaging pin 125 abuts on the proximal end face 128 of the receiving cavity 126.

The valve member 30 is assembled to the tubular body 20X in the following manner. The valve member 30 is inserted into the tubular body 20X from the proximal side. At this time, the spring 51 is set to be wound around the valve member 30 at a part closer to the distal end than the hook part 34. Alternatively, the spring 51 alone may be inserted into the tubular body 20X before the insertion of the valve member 30.

When inserting the valve member 30 into the tubular body 20X, the engaging pin 125 of the valve member 30 is received in the guide groove 121 of the tubular body 20X from the proximal end opening 122K (see FIG. 15(A) and FIG. 15(B)). Since there is the tapered slope 122T at the open edge of the proximal end opening 122K of the guide groove 121, the engaging pin 125 can be readily received in the guide groove 121.

Once the valve member 30 is inserted inside the tubular body 20X, the engaging pin 125 moves in the guide groove 121 (more particularly, in the straight groove portion 122) toward the distal side of the tubular body 20X, while the valve body part 32 fits into the valve opening 12. As the valve member 30 enters further into the tubular body 20X, the engaging pin 125 advances into the curved groove portion 123 of the guide groove 121, causing the valve member 30 to turn to one side in the circumferential direction of the tubular body 20X, and the valve body part 32 to come out of the valve opening 12 to the distal side of the tubular body 20X.

When the engaging pin 125 reaches the distal portion in the axial direction of the tubular body 20X of the guide groove 121, and the valve member is turned further to the one side in the circumferential direction of the tubular body, the engaging pin 125 enters the receiving cavity 126 (see FIG. 14(A) and FIG. 14(B)). At this time, the spring is compressed between the first annular protrusion 21 of the tubular body 20X and the hook part 34 of the valve member 30, so that the valve member 30 is biased toward the proximal side of the tubular body 20X. When the engaging pin 125 abuts on the proximal end face 128 of the receiving cavity 126, the valve member 30 is set in position relative to the tubular body 20X as mentioned above (see FIG. 13(A) and FIG. 13(B)). In this state, the valve body part 32 fits in the valve opening 12 so that the valve opening 12 is closed. The valve member 30 is thus assembled to the tubular body 20X.

The valve 10X of this embodiment allows the valve member 30 alone to be replaced from the proximal side of the tubular body 20X, with the distal end part of the tubular body 20X being attached to the rim 90 of the tire wheel, by moving the valve member 30 in the opposite direction from when it was assembled to the tubular body 20X.

More specifically, first, the valve member 30 is pushed toward the distal side of the tubular body 20X. When the engaging pin 125 has abutted on the distal end face 127 of the receiving cavity 126 (see the transition from FIG. 13 to FIG. 14), the valve member 30 is turned to the other side in the circumferential direction of the tubular body 20X. This causes the engaging pin 125 to enter into the curved groove portion 123 of the guide groove 121 and make contact with an inner face of the curved groove portion 123 (i.e., outer circumferential portion 123S of the curved groove portion 123). The valve member 30 is further turned and pulled out to the proximal side of the tubular body 20X, while the engaging pin 125 moves in the guide groove 121 to the proximal end of the tubular body 20X, so that the engaging pin 125 comes out of the guide groove 121, allowing the valve member 30 to be removed from the tubular body 20X. As the engaging pin 125 enters into the guide groove 121, the valve member 30 is pushed toward the proximal side of the tubular body 20X by the biasing force of the spring 51, so that it is made easy to pull out the valve member 30 from the proximal side of the tubular body 20X.

In this embodiment, the engaging pin 125 of the valve member 30 and the receiving recess 120 of the tubular body 20X constitute the retaining mechanism 60X. The state wherein the engaging pin 125 is received in the receiving cavity 126 of the receiving recess 120 corresponds to a "restricting state" of the retaining mechanism 60X. The state wherein the engaging pin 125 is received in the guide groove 121 of the receiving recess 120 corresponds to a "permitting state" of the retaining mechanism 60X. The receiving recess 120 may be a receiving hole that extends through between inside and outside of the tubular body 20X.

Other Embodiments (1) While the object having the valve attachment hole 91 to which the valve 10 is mounted is a rim 90 of a tire wheel in the embodiments described above, the object is not limited to this and may be a fluid machinery or tubing having a valve attachment hole at a distal end of a fluid passage.

Figure 16:
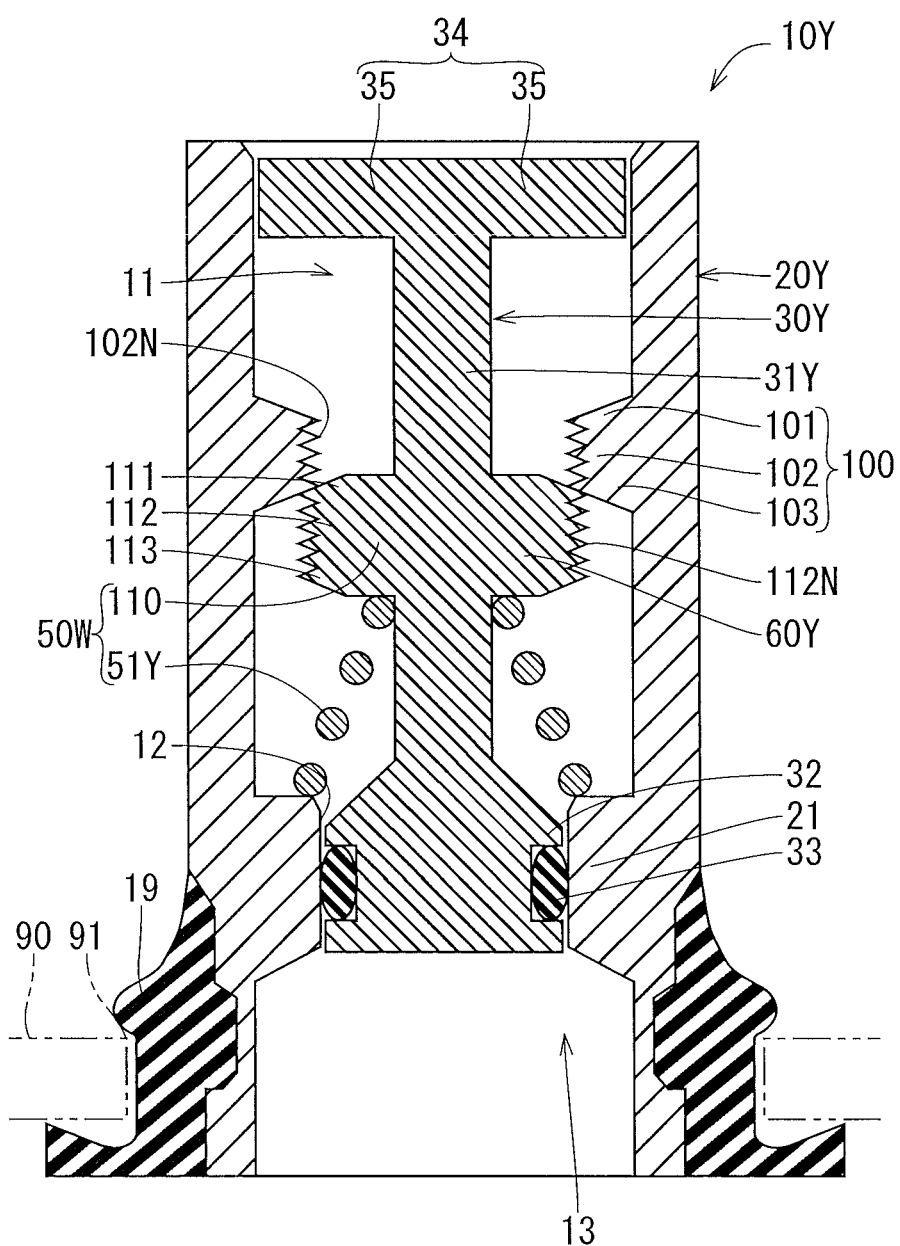
FIG. 16 is a cross-sectional side view of a valve according to another embodiment.

(2) In the third embodiment, as shown in FIG. 16, the retainer protrusion 110 having the external threads 112N and the second annular protrusion 100 having the internal threads 102N may be positioned closer to the proximal end of the tubular body than the valve body part 32 and the first annular protrusion 21. In the valve 10Y shown in FIG. 16, the valve body part 32 extends out from a distal end portion of the shaft part 31Y of the valve member 30Y, while the retainer protrusion 110Y extends out from a midway point of the shaft part 31Y. The outside diameter of the valve body part 32 is equal to or smaller than the inside diameter of the second annular protrusion 100. In this configuration, the spring 51Y is set between the first annular protrusion 21 of the tubular body 20Y and the retainer protrusion 110 of the valve member 30Y, for example, and it is a tapered coil spring gradually reducing in diameter toward the proximal side of the tubular body 20Y. The largest outside diameter of the spring 51Y should preferably be equal to or smaller than the inside diameter of the second annular protrusion 100. This allows the spring 51Y to be inserted to or removed from the tubular body 20Y easily from the proximal side.

Figure 17:
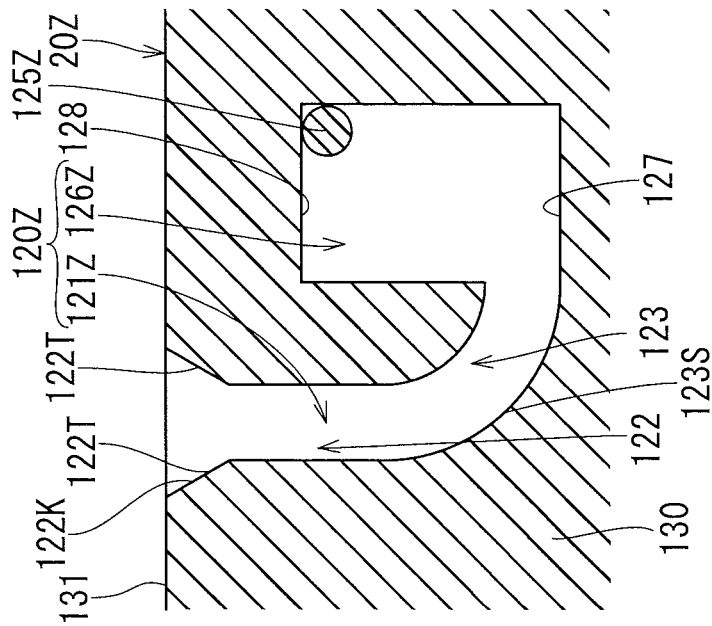
FIG. 17(A) is a cross-sectional side view of a valve according to another embodiment, and (B) is a cross-sectional side view of the vicinity of a receiving recess and an engaging pin viewed in inside of a tubular body in a circumferential development view of the tubular body.
Figure 17:
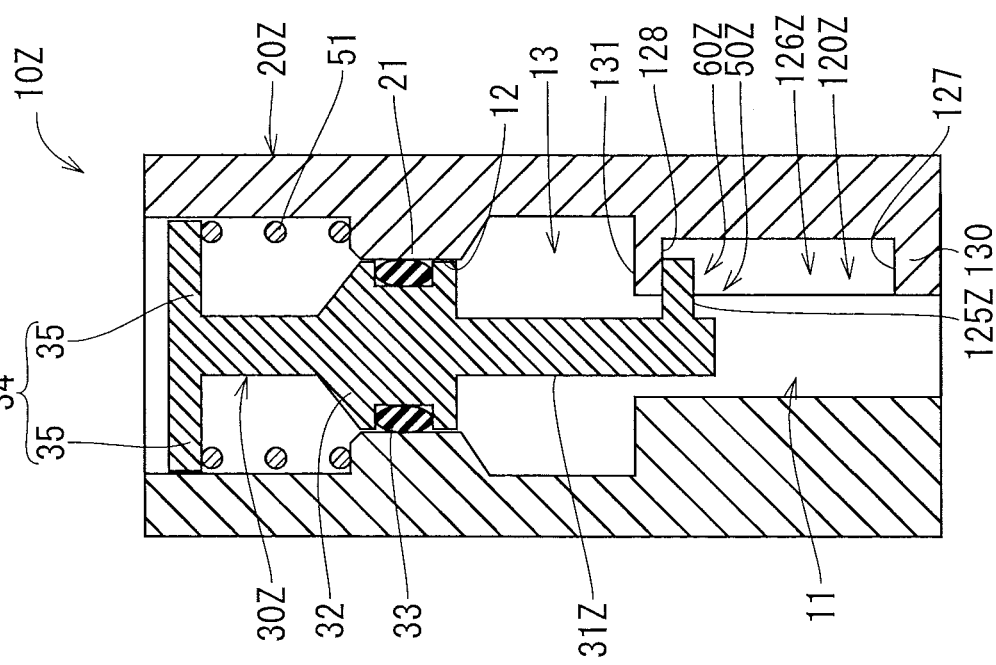

(3) In the fourth embodiment, the layout of the engaging pin 125 and the receiving recess 120 may be changed, as in the valve 10Z shown in FIG. 17(A) and FIG. 17(B). In the valve 10Z, a radially reducing surface 131 where the diameter of the fluid flow passage 11 is reduced stepwise on the distal side is provided on the inner circumferential surface of the tubular body 20Z closer to the distal end of the tubular body 20Z than the first annular protrusion 21. The receiving recess 120Z is provided in the inner circumferential surface of a distal small-diameter part 130 that is closer to the distal end of the tubular body 20Z than this radially reducing surface 131. The proximal end opening 122K of the guide groove 121Z of the receiving recess 120Z opens in the radially reducing surface 131. In the valve 10Z, the valve body part 32 extends out from a midway point of the shaft part 31Z of the valve member 30Z, while the engaging pin 125Z extends out from a distal end portion of the shaft part 31Z. The engaging pin 125Z should preferably protrude equally to or less from the shaft 31Z than the valve body part 32. This allows the valve member 30Z to be inserted to or removed from the tubular body 20Z easily from the proximal side. In the valve 10Z, the valve chamber 13 is formed by part of the fluid flow passage 11 between the first annular protrusion 21 and the distal small-diameter part 130.

Figure 18:
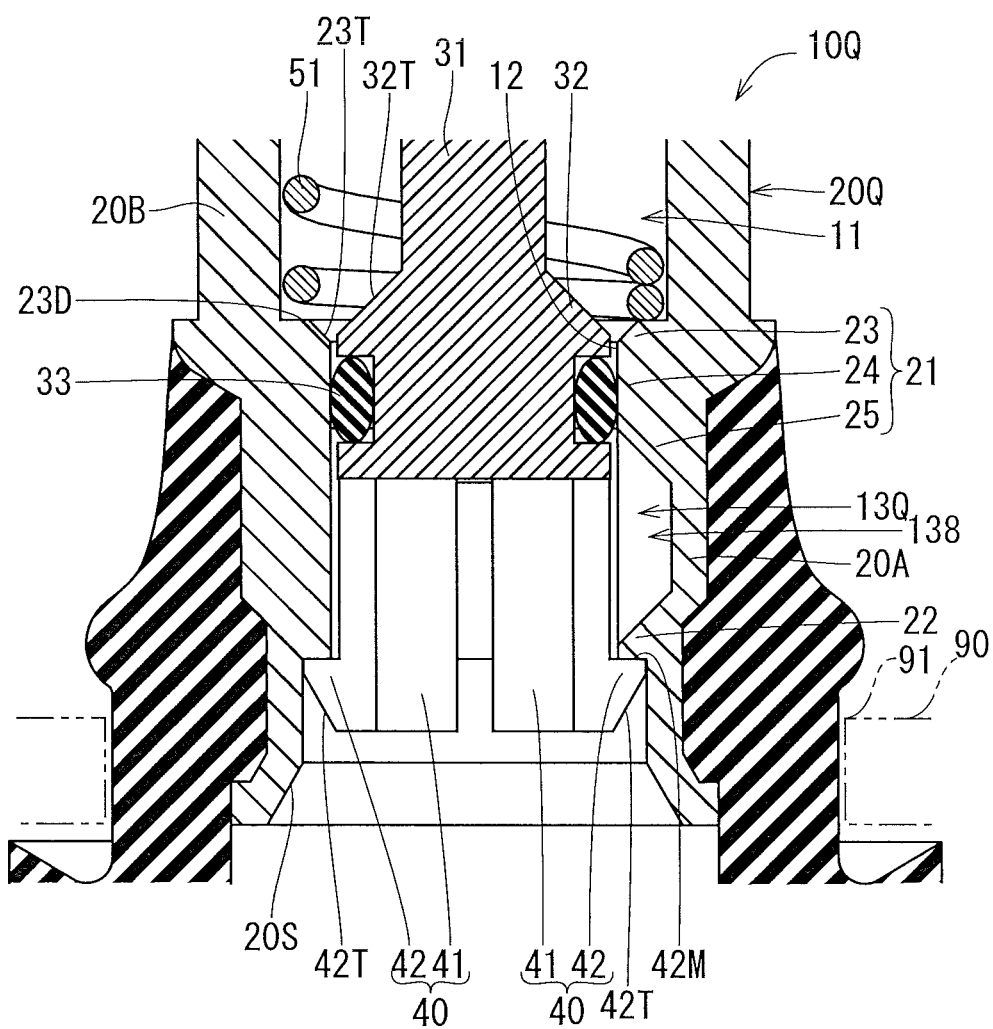
FIG. 18 is an enlarged cross-sectional side view of a valve according to another embodiment.

(4) In an optional configuration, as in the valve 10Q shown in FIG. 18, the valve chamber 13Q may be formed with a communication groove 138 extending along the axial direction of the tubular body 20Q in an inner circumferential surface of a hole having the same diameter as the valve opening 12. The communication groove 138 is longer than the valve body part 32 in the axial direction of the tubular body 20Q, so that, when the entire valve body part 32 is positioned inside the valve chamber 13Q, the fluid can flow between the valve opening 12 and the valve attachment hole 91 via the communication groove 138.

(5) While the projections 41 of the retainer piece 40 are in a circular arc shape in the first embodiment described above, they may be plate-like. If this is the case, the projections 41 should preferably be arranged such that their plate thickness direction is oriented in the radial direction of the shaft part.

(6) While the hook part 34 in the first embodiment described above is configured to have a pair of extensions 35 protruding from the shaft part 31 in the opposite directions, the hook part 34 may be configured to have one extension 35 protruding radially from the shaft part 31, or configured to have three or more extensions 35 protruding in a radial direction from the shaft part 31 (for example radially). Alternatively, the hook part 34 may not be provided to the valve member 30.

(7) While the tubular body 20 in the first embodiment described above is provided with an elastic cover member 19 fixedly attached to the outer circumferential surface, the distal end portion of the tubular body 20 may be directly attached to the valve attachment hole of an object to which the valve 10 is mounted, without the elastic cover member 19.

(8) In the second embodiment described above, the cap 70 may be provided with external threads, and the tubular body 20V may be provided with internal threads, so that the cap 70 is fixed to the tubular body 20V by screw engagement of these external threads and internal threads. If this is the case, the internal threads of the tubular body 20V may be provided, for example, on the inner circumferential surface of the tubular body 20V closer to the proximal end than the second annular protrusion 22V. The cap 70 may be made up, for example, of a small-diameter part that is inserted into the tubular body 20V and faces the retainer piece 40V from radially inside of the tubular body 20V, and a large-diameter part 72 positioned closer to the proximal end of the tubular body 20V than the small-diameter part, the external threads being provided on the outer circumferential surface of the large-diameter part.

DESCRIPTION OF THE REFERENCE NUMERAL

10 Valve
12 Valve opening
13 Valve chamber
20 Tubular body
21 First annular protrusion
22 Second annular protrusion
30 Valve member
31 Shaft part
32 Valve body part
40 Retainer piece
50 Valve body holding mechanism
51 Spring
60 Retaining mechanism
90 Rim
91 Valve attachment hole

The invention claimed is:

1. A valve comprising:
a tubular body having one end to be attached to a valve attachment hole provided in an object to which the valve is mounted;
a valve opening formed inside the tubular body;
a valve member passing through inside the tubular body to open and close the valve opening;
a shaft part provided to the valve member and extending along an axial direction of the tubular body;
a valve body part provided to the valve member and radially extending out from the shaft part to slidably fit in the valve opening;
a valve chamber provided to the tubular body in a part adjacent to the valve opening on a one end side in the axial direction and connecting the valve opening and the valve attachment hole in a state wherein the valve body part is entirely accommodated therein;
a valve body holding mechanism that holds the valve body part inside the valve opening wherein the valve member is not subjected to an operating force that causes the valve member to move in the axial direction of the tubular body, and that allows the valve body part to separate from the valve opening wherein the valve member receives an operating force that moves the valve member toward the one end side of the tubular body; and
wherein the valve body holding mechanism includes a retaining mechanism capable of changing between a restricting state wherein the valve member is prevented from coming off from an other end side of the tubular body, and a permitting state wherein the valve member is allowed to come off from the other end side of the tubular body.

2. The valve according to claim 1, wherein the valve chamber has a larger diameter than the valve opening, and is provided with a first tapered surface gradually reducing in diameter toward the valve opening on an inner face of the valve chamber at one end facing the valve opening.

3. The valve according to claim 1, further comprising an annular protrusion protruding from an inner circumferential surface of the tubular body, wherein
the retaining mechanism includes a projection extending from the valve member along the axial direction of the tubular body, configured to engage with the annular protrusion from the one end side of the tubular body, and the projection is elastically deformable in a radial direction of the tubular body such as to fit inside the annular protrusion; and
the valve body holding mechanism includes a spring biasing the valve member toward the other end side of the tubular body.

4. The valve according to claim 2, further comprising an annular protrusion protruding from an inner circumferential surface of the tubular body, wherein
the retaining mechanism includes a projection extending from the valve member along the axial direction of the tubular body, configured to engage with the annular protrusion from the one end side of the tubular body, and the projection is elastically deformable in a radial direction of the tubular body such as to fit inside the annular protrusion; and the valve body holding mechanism includes a spring biasing the valve member toward the other end side of the tubular body.

5. The valve according to claim 3, wherein a second tapered surface gradually reducing in diameter toward the one end side of the tubular body is provided to one side of the annular protrusion facing the other end side of the tubular body.

6. The valve according to claim 4, wherein a second tapered surface gradually reducing in diameter toward the one end side of the tubular body is provided to one side of the annular protrusion facing the other end side of the tubular body.

7. The valve according to claim 3, comprising a plurality of the retainer pieces substantially equally spaced around an axis of the shaft part.

8. The valve according to claim 4, comprising a plurality of the retainer pieces substantially equally spaced around an axis of the shaft part.

9. The valve according to claim 5, comprising a plurality of the retainer pieces substantially equally spaced around an axis of the shaft part.

10. The valve according to claim 6, comprising a plurality of the retainer pieces substantially equally spaced around an axis of the shaft part.

11. The valve according to claim 1, comprising a hook part extending radially from the other end in the axial direction of the shaft part.

12. The valve according to claim 2, comprising a hook part extending radially from the other end in the axial direction of the shaft part.

13. The valve according to claim 3, comprising a hook part extending radially from the other end in the axial direction of the shaft part.

14. The valve according to claim 5, comprising a hook part extending radially from the other end in the axial direction of the shaft part.

15. The valve according to claim 7, comprising a hook part extending radially from the other end in the axial direction of the shaft part.

16. The valve according to claim 11, wherein the hook part includes a pair of extensions extending from the shaft part in opposite directions, and each of the extensions has an extended tip at a substantially same distance from a center axis of the shaft part as a radius of the inner circumferential surface of the tubular body in a part surrounding the pair of extensions.

17. The valve according to claim 12, wherein the hook part includes a pair of extensions extending from the shaft part in opposite directions, and each of the extensions has an extended tip at a substantially same distance from a center axis of the shaft part as a radius of the inner circumferential surface of the tubular body in a part surrounding the pair of extensions.

18. The valve according to claim 13, wherein the hook part includes a pair of extensions extending from the shaft part in opposite directions, and each of the extensions has an extended tip at a substantially same distance from a center axis of the shaft part as a radius of the inner circumferential surface of the tubular body in a part surrounding the pair of extensions.

19. The valve according to claim 14, wherein the hook part includes a pair of extensions extending from the shaft part in opposite directions, and each of the extensions has an extended tip at a substantially same distance from a center axis of the shaft part as a radius of the inner circumferential surface of the tubular body in a part surrounding the pair of extensions.

20. The valve according to claim 15, wherein the hook part includes a pair of extensions extending from the shaft part in opposite directions, and each of the extensions has an extended tip at a substantially same distance from a center axis of the shaft part as a radius of the inner circumferential surface of the tubular body in a part surrounding the pair of extensions.

* * * * *